US009353768B2

(12) United States Patent
Avni

(10) Patent No.: US 9,353,768 B2
(45) Date of Patent: May 31, 2016

(54) HYDROMECHANICAL CONTINUOUSLY VARIABLE TRANSMISSION

(71) Applicant: BenZion Avni, Kfar Saba (IL)

(72) Inventor: BenZion Avni, Kfar Saba (IL)

(*) Notice: Subject to any disclaimer, the term of this patent is extended or adjusted under 35 U.S.C. 154(b) by 0 days.

(21) Appl. No.: 14/161,076

(22) Filed: Jan. 22, 2014

(65) Prior Publication Data

US 2015/0354607 A1 Dec. 10, 2015

Related U.S. Application Data

(60) Provisional application No. 61/759,025, filed on Jan. 31, 2013.

(51) Int. Cl.
| | |
|---|---|
| *F15B 11/16* | (2006.01) |
| *F15B 15/06* | (2006.01) |
| *F03C 1/04* | (2006.01) |
| *F04B 1/04* | (2006.01) |
| *B60K 6/543* | (2007.10) |
| *F04B 1/053* | (2006.01) |
| *B60K 17/28* | (2006.01) |
| *F16H 37/00* | (2006.01) |
| *F16H 39/00* | (2006.01) |
| *F16H 39/24* | (2006.01) |

(52) U.S. Cl.
CPC .............. *F15B 11/16* (2013.01); *B60K 6/543* (2013.01); *B60K 17/28* (2013.01); *F03C 1/0419* (2013.01); *F03C 1/0422* (2013.01); *F03C 1/0425* (2013.01); *F04B 1/043* (2013.01); *F04B 1/0426* (2013.01); *F04B 1/0435* (2013.01); *F04B 1/053* (2013.01); *F15B 15/06* (2013.01); *F16H 37/00* (2013.01); *F16H 39/00* (2013.01); *F16H 39/24* (2013.01)

(58) Field of Classification Search
CPC .......... F15B 11/16; F15B 15/06; F15B 15/24; F15B 2211/20546; F16H 39/24; F16H 39/20; B60K 17/28; B60K 6/543; B60K 2025/024; B60K 2025/026; B60K 41/12; B60K 41/147; B60K 41/167; B60K 41/16; B60K 41/06; B60K 41/00; B60K 41/142; B60K 41/162; B60K 2741/12; B60K 2741/14; B60K 2741/16; B60K 2741/145; B60K 2741/165; F03C 1/0425; F03C 1/0419; F03C 1/0422; F04B 1/0426; F04B 1/043; F04B 1/0435; F04B 1/053; F04B 1/0452
USPC .................................................... 91/475, 481
See application file for complete search history.

(56) References Cited

U.S. PATENT DOCUMENTS 7,225,720 B2 * 6/2007 Lampinen ............. F03C 1/0425
91/473

* cited by examiner

*Primary Examiner* — Nathaniel Wiehe
*Assistant Examiner* — Logan Kraft
(74) *Attorney, Agent, or Firm* — The IP Law Firm of Guy Levi, LLC; Guy Levu

(57) ABSTRACT

The disclosure is directed to a transmission, and more particularly to a semi-Continually Variable Transmission (sCVT), a semi-Continuous, Variable Displacement Motor, a semi-Continuously Reciprocating Multiplex Pump (sCVDP) and an infinitely variable transmission (IVT).

20 Claims, 19 Drawing Sheets

SECTION B-B

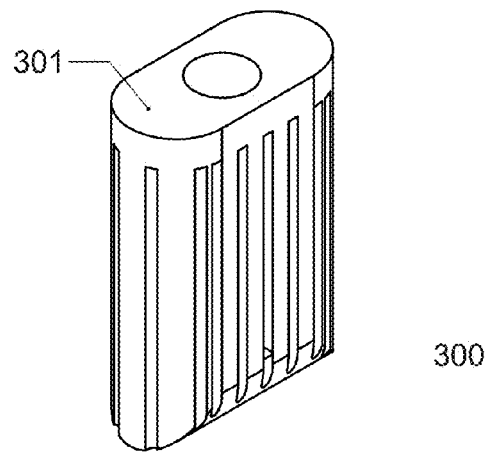
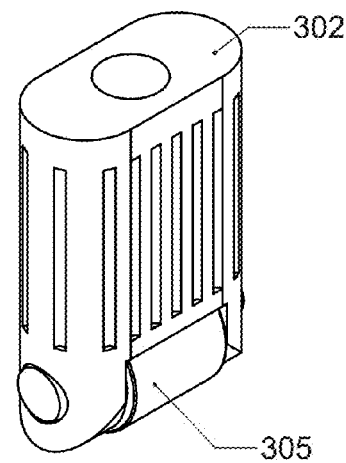
Fig- 8A
Fig- 8B
300
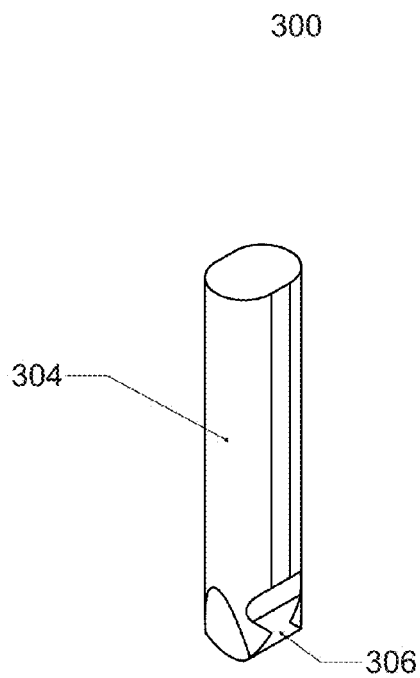
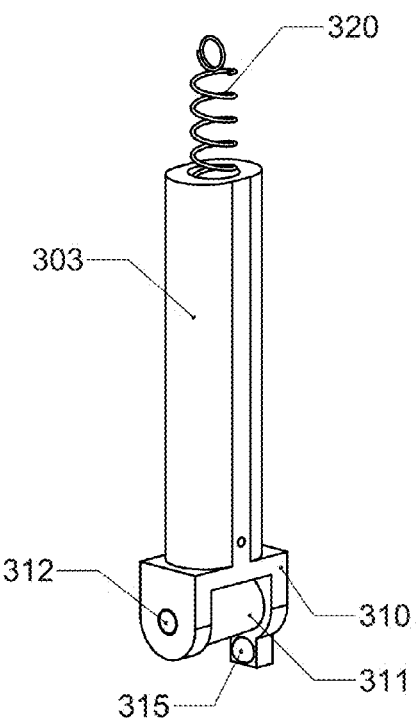
Fig- 8C
Fig- 8D

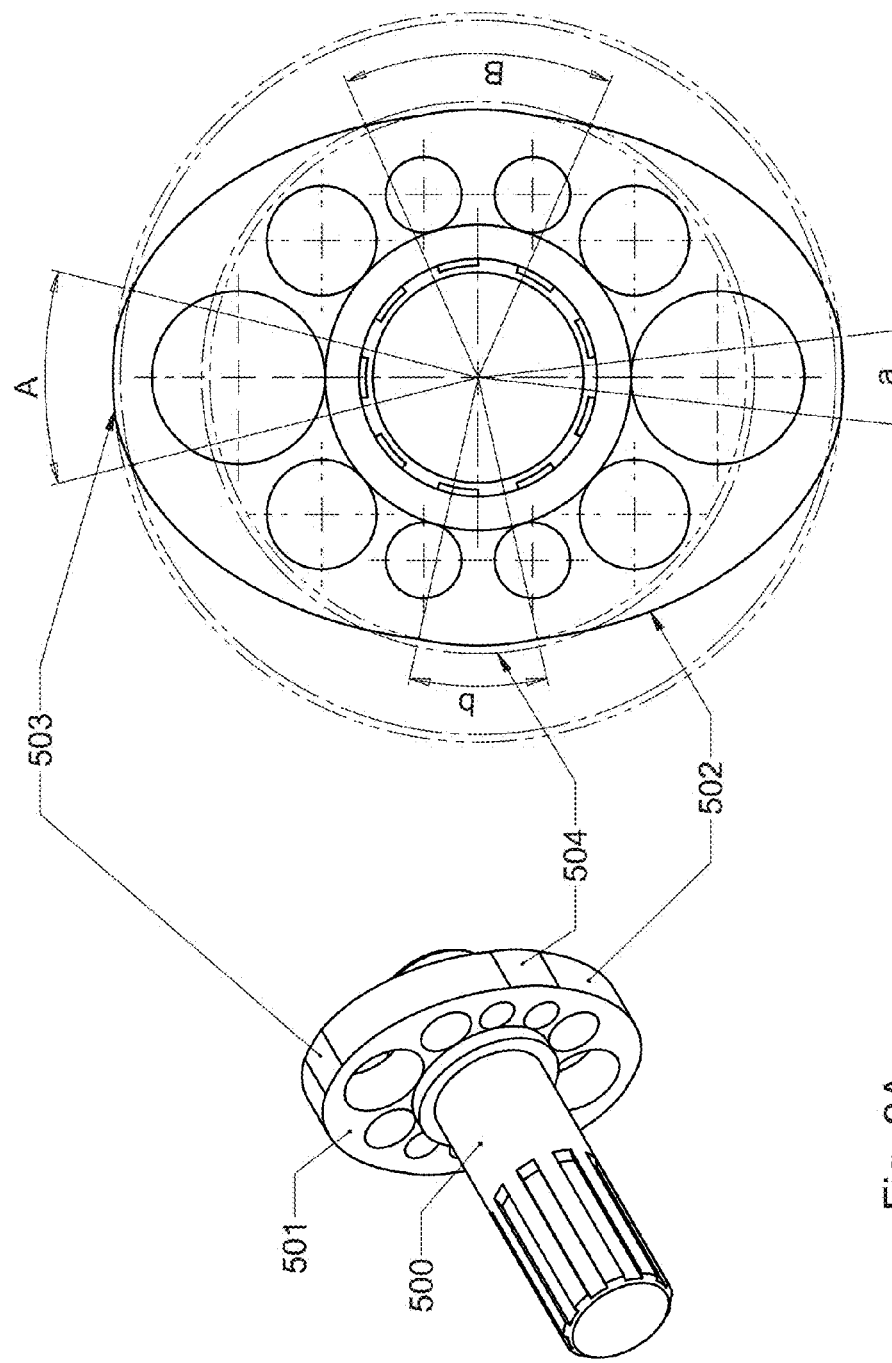

DETAIL E

DETAIL D

DETAIL K

HYDROMECHANICAL CONTINUOUSLY VARIABLE TRANSMISSION

CROSS REFERENCE TO RELATED APPLICATIONS

This application claims the benefit of U.S. Provisional Application No. 61/759,025, filed Jan. 31, 2013, the disclosures of the foregoing applications is incorporated herein by reference in its entirety.

BACKGROUND

The present disclosure relates to transmission, and more particularly to Semi-Continuous Variable Transmission (sCVT), and infinitely variable transmission (IVT).

Although CVTs and IVTs were typically used in the automotive field, their torque capabilities and reliability have been limited in the past. Conventional transmissions allow for the selection of discrete gear ratios, thus limiting the engine to providing maximum power or efficiency for limited ranges of output speed.

There are several classifications of CVTs; hydrostatic, friction and traction. Friction CVT is one of the most common forms of CVTs in use. These CVTs are based on friction between two or more rotating components to transmit power between a motor and a wheel axle, the radius for the point of contact can be varied, this typically archived with a variable-diameter pulley (VDP). Friction/traction CVT has proven problematic to certain applications due to large size (weight), high cost of components, material fatigue resulting in performance lost and other issues.

Alternatively, Toroid Traction-Drive transmissions use the high shear strength of viscous fluids to transmit torque between an input torus and an output torus. In properly designed traction drives, power is transferred from the driving roller to the driven roller through the shearing of the fluid film between the toroids (conical portions) and the rollers. Toroid Traction-Drive transmissions has proven problematic to certain applications due to transient elastohydrodynamic lubrication problems, size (weight), overheating of pads, loss of friction and other issues.

Likewise, Hydrostatic (HST) CVT is typically based on hydraulic pump coupled to a hydraulic motor, where, by varying the displacement per revolution of pump and motor, the transmission ratio will define the torque and speed typically controlled by external means. HST though, has proven problematic to certain applications due to low efficiency of transmission, limited speed range and narrow shift range. Low speed high efficiency, high speed low efficiency.

CVTs/IVTs are currently being developed in conjunction with hybrid electric vehicles. As CVT/IVT development continues, costs may be further reduced and performance will improve, which in turn makes further development and application of CVT/IVT technology desirable.

SUMMARY

Disclosed, in various embodiments, is a hydromechanical, continuously variable and/or infinitely variable transmission. Specifically, disclosed are transmission wherein the number of pistons involved in generating the movement varies depending on the torque demands of the system.

In an embodiment provided herein is a hydromechanical, semi continuously variable transmission (sCVT), which can include Semi Continuous Variable Displacement Motor (sCVDM), semi Continuous Multiplex Reciprocating Pump (sCMRP) or (sCVDM) with regular hydraulic pump or (sCMRP) with regular hydraulic Motor (IVT), comprising: a transmission housing base disc, comprising an inlet port for a hydraulic fluid; a cylindrical transmission housing having a proximal axial end and a distal axial end, and an internal radial surface and external radial surface, the transmission housing defining a plurality of bores disposed radially at the distal axial end, wherein the proximal axial end is operably coupled to the transmission housing base disc; a plurality of valve housing each having a proximal axial end and a distal axial end disposed axially above the plurality of bores defined in the transmission housing, the valve housing having an inlet port and an outlet port and being in fluid communication with a hydraulic pump and operably coupled to an actuator; a plurality of pistons, each slidably coupled within the bore defined in the periphery of the cylindrical transmission housing having a proximal end and a distal end, wherein the proximal end extends into the internal radial surface of the cylindrical transmission housing, configured to engage a drive shaft; a plurality of valves, each disposed within the valve housing, the valve operably coupled to an actuator and configured to regulate fluid communication between the distal end of the piston and the hydraulic fluid by exposing or blocking the inlet port and the outlet port of the hydraulic fluid; a drive shaft, having a distal end and a proximal end, the drive shaft having an elliptical head having a longitudinal axis and a transverse axis perpendicular to the longitudinal axis disposed at the proximal end of the drive shaft, wherein the distal end extends beyond a transmission housing cover disc and is operably coupled to a wheel or a gear and the proximal end is operably coupled to an encoder; an encoder centrally coupled to the transmission housing base disc and coupled to the elliptical drive shaft head; a transmission housing cover disc, coupled to the distal end of the cylindrical transmission housing; a plurality of actuators, each operably coupled to the valve; and a control module, configured to receive input from a plurality of sensors and engage a predetermined number of pistons at a predetermined location along the periphery of the cylindrical transmission housing, the location of the actuators configured to impart continuous radial motion to the drive shaft head, wherein the number of piston engaged depends on the input received from the plurality of sensors.

In another embodiment, provided herein is a hydromechanical, semi continuously variable transmission (sCVT), comprising: a transmission housing base disc, comprising an inlet port for a hydraulic fluid; a cylindrical transmission housing having a proximal axial end and a distal axial end, and an internal radial surface and external radial surface, the transmission housing defining a cylindrical space, configured to receive a plurality of axially oriented pistons, wherein the proximal axial end is operably coupled to the transmission housing base disc; a plurality of spool valve housing each having a proximal axial end and a distal axial end disposed radially, the spool valve housing having an inlet port and an outlet port and being in fluid communication with a hydraulic pump and operably coupled to an actuator; a plurality of axially oriented pistons, each slidably coupled within the cylindrical space defined in the periphery of the cylindrical transmission housing having a proximal end and a distal end, wherein the proximal end extends into the internal axial surface of the cylindrical transmission housing, configured to engage a drive shaft head; a plurality of spool valves, each disposed within the spool valve housing, the valve operably coupled to an actuator and configured to regulate fluid communication between the distal end of the piston and the hydraulic fluid by exposing or blocking the inlet port and the outlet port of the hydraulic fluid; a drive shaft, having a distal end and a proximal end, the drive shaft having a drive shaft head defining a cylinder, the cylinder having an internal surface and external surface and being closed in the distal end, with the proximal end defining a sinusoidal surface configured to engage the distal end of the piston, and wherein the distal end of the shaft extends beyond a transmission housing cover disc and is operably coupled to a wheel or a gear and the proximal end of the drive shaft is operably coupled to an encoder; an encoder centrally coupled to the transmission housing base disc and coupled to the elliptical drive shaft; a transmission housing cover disc, coupled to the distal end of the cylindrical transmission housing; a plurality of servo motors, each operably coupled to the cylindrical transmission housing; means for converting each servo motor's rotational motion to reciprocating linear motion, the conversion means operably coupling each spool valve to each servo motor; and a control module, configured to receive input from a plurality of sensors and engage a predetermined number of actuators at a predetermined location along the periphery of the cylindrical transmission housing, the location of the pistons configured to impart continuous radial motion to the drive shaft head, wherein the number of piston engaged depends on the input received from the plurality of sensors.

In yet another embodiment, provided herein is a vehicle comprising: an engine; a hydraulic pump coupled to the engine, wherein the hydraulic pump is a hydromechanical, Semi Continuously Variable Transmission (sCVT).

In yet another embodiment, provided herein is a method of modulating the transmission ratio between a motor's drive shaft and a wheels or gear operably coupled to the motor, the method comprising the steps of: coupling the motor drive shaft to a hydraulic pump; coupling the hydraulic pump to a hydromechanical, Semi Continuously Variable Transmission (sCVT); coupling the hydromechanical, Semi Continuously Variable Transmission (sCVT), to a gear or a wheel, whereby the hydromechanical, Semi Continuously Variable Transmission (sCVT), is configured to rotate a drive shaft coupled to the gear or wheel using hydraulic fluid pumped by the hydraulic pump to actuate a plurality of pistons disposed radially or axially around the drive shaft head; and, by adding or reducing the number of working pistons per revolution of the hydromechanical, sCVT's drive shaft head, continuously varying the flow of the hydraulic fluid by discrete variable displacement per revolution, thereby changing the volume of displacement per revolution and modulating the ratio between a motor's drive shaft and the wheel or gear operably coupled to the motor. A.

These and other features of the hydromechanical CVT will become apparent from the following detailed description when read in conjunction with the drawings, which are exemplary, not limiting, and wherein like elements are numbered alike in several figures.

BRIEF DESCRIPTION OF THE FIGURES

For a better understanding of the hydromechanical CVT, with regard to the embodiments thereof, reference is made to the accompanying drawings, in which like numerals designate corresponding elements or sections throughout and in which:

FIGS. 6A-6D illustrate in FIG. 6A illustrates a cross section embodiment of the radial piston orientation of the hydromechanical continuous variable transmission along Y-Z plane, while FIG. 6B, is a magnified illustration section C in FIG. 6A, and FIG. 6C is an illustration of a rotating valve shown in FIG. 6B, and FIG. 6D is alternative linear spool valve to that of FIG. 6B;

FIGS. 8A-8D illustrate various embodiments of pistons with an elliptical axial cross section with FIG. 8A showing a piston type A and FIG. 8B showing an embodiment of piston type B used in the radial piston orientation of the hydromechanical sCVT, axial arrangement pistons are shown in FIGS. 8C and 8D.

FIGS. 9A and 9B show an alternative configuration of the elliptical drive shaft head with front view (FIG. 9A) and isometric view (FIG. 9B), illustrating the change in curvature at the vertices of the ellipse;

DETAILED DESCRIPTION OF THE INVENTION

Figure 1:
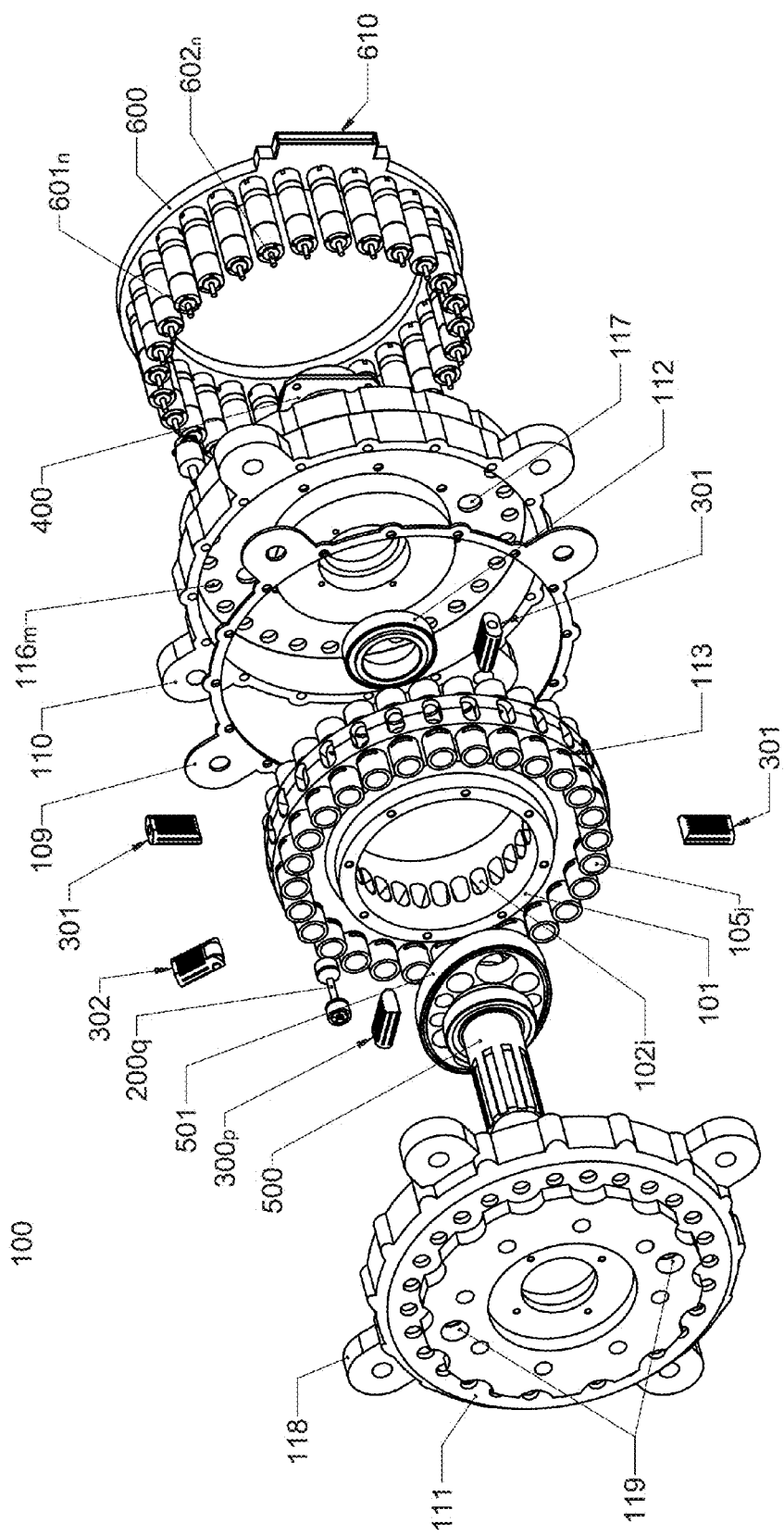
FIG. 1 shows and exploded view of an embodiment of the radial piston orientation of the hydromechanical continuous variable transmission.
Figure 2:
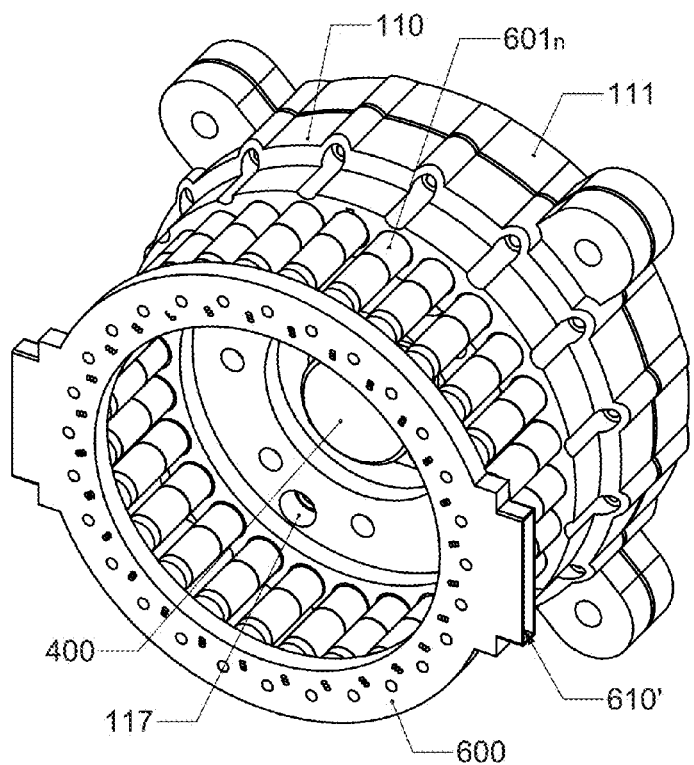
FIG. 2 illustrates an isometric rear view of an embodiment of the radial piston orientation of the hydromechanical continuous variable transmission.

Provided herein are embodiments of Semi-Continuous Variable Transmission (sCVT), which can include, or be interchangeable with Semi Continuous Variable Displacement Motor (sCVDM), semi Continuous Multiplex Reciprocating Pump (sCMRP) or (sCVDM) with regular hydraulic pump or (sCMRP) with regular hydraulic Motor (IVT). The sCVT described herein is characterized in that the number of operating pistons in contact with the drive shaft head varies depending on the demand of the system, in terms of torque applied to the drive shaft in the case of a motor, or the product of the desired flow-rate and viscosity of the fluid pumped in the case of a pump.

Operation of hydrostatic transmission is based on converting mechanical rotational motion into fluid flow by powering a hydrostatic pump, and back to mechanical rotational motion by using hydrostatic motor. In hydraulic systems pressure generated, can represent torque and flow rate can represent speed. In hydrostatic (pump or motor or both). Increasing pump displacement (in other words, flow rate) will increase the hydrostatic motor's speed and decrease the torque; while reduction of pump displacement (e.g., flow rate) will decrease the hydrostatic motor's speed and increase torque applied to the hydrostatic motor's drive shaft.

In the disclosed technology, fluid flow is continuously varied by discrete variable displacement per revolution. The displacement volume per revolution of the hydromechanical sCVT motor/pump can be divided into a number discrete volumes, (displacement per revolution volume divided to the number of cylinders, each part of volume is a cylinder), with all cylinders being located either radially at the base body around an elliptical drive shaft head, or axially along a cylindrical drive shaft head having a lip defining a sinusoidal surface, and control, monitor and operate by transmission CPU (central processing unit, electronic or mechanical), each cylinder has a piston and by adding or reducing the number of working pistons in an operation cycle, based on the torque demand in the case of a motor and the product of viscosity and flow rate in the case of a pump, the displacement per revolution can be varied and transmission ratio between the motor and the wheels can be set accordingly.

In the hydromechanical sCVT assemblies described herein fluid flow rate is continuously varied by discrete variable displacement per revolution of the hydrostatic motor's drive shaft head. Accordingly, provided herein is a hydromechanical, semi continuously variable transmission (sCVT), comprising: a transmission housing base disc, comprising an inlet port for a hydraulic fluid; a cylindrical transmission housing having a proximal axial end and a distal axial end, and an internal radial surface and external radial surface, the transmission housing defining a plurality of bores disposed radially at the distal axial end, wherein the proximal axial end is operably coupled to the transmission housing base disc; a plurality of valve housing each having a proximal axial end and a distal axial end disposed axially above the plurality of bores defined in the transmission housing, the valve housing having an inlet port and an outlet port and being in fluid communication with a hydraulic pump and operably coupled to an actuator; a plurality of pistons, each slidably coupled within the bore defined in the periphery of the cylindrical transmission housing having a proximal end and a distal end, wherein the proximal end extends into the internal radial surface of the cylindrical transmission housing, configured to engage a drive shaft; a plurality of valves, each disposed within the valve housing, the valve operably coupled to an actuator and configured to regulate fluid communication between the distal end of the piston and the hydraulic fluid by exposing or blocking the inlet port and the outlet port of the hydraulic fluid; a drive shaft, having a distal end and a proximal end, the drive shaft having an elliptical head having a longitudinal axis and a transverse axis perpendicular to the longitudinal axis disposed at the proximal end of the drive shaft, wherein the distal end extends beyond a transmission housing cover disc and is operably coupled to a wheel or a gear and the proximal end is operably coupled to an encoder; an encoder centrally coupled to the transmission housing base disc and coupled to the elliptical drive shaft head; a transmission housing cover disc, coupled to the distal end of the cylindrical transmission housing; a plurality of actuators, each operably coupled to the valve; and a control module, configured to receive input from a plurality of sensors and engage a predetermined number of pistons at a predetermined location along the periphery of the cylindrical transmission housing, the location of the actuators configured to impart continuous radial motion to the drive shaft head, wherein the number of piston engaged depends on the input received from the plurality of sensors.

Alternatively, provided herein is a hydromechanical, semi continuously variable transmission (sCVT), comprising: a transmission housing base disc, comprising an inlet port for a hydraulic fluid; a cylindrical transmission housing having a proximal axial end and a distal axial end, and an internal radial surface and external radial surface, the transmission housing defining a cylindrical space, configured to receive a plurality of axially oriented pistons, wherein the proximal axial end is operably coupled to the transmission housing base disc; a plurality of spool valve housing each having a proximal axial end and a distal axial end disposed radially, the spool valve housing having an inlet port and an outlet port and being in fluid communication with a hydraulic pump and operably coupled to an actuator; a plurality of axially oriented pistons, each slidably coupled within the cylindrical space defined in the periphery of the cylindrical transmission housing having a proximal end and a distal end, wherein the proximal end extends into the internal axial surface of the cylindrical transmission housing, configured to engage a drive shaft head; a plurality of spool valves, each disposed within the spool valve housing, the valve operably coupled to an actuator and configured to regulate fluid communication between the distal end of the piston and the hydraulic fluid by exposing or blocking the inlet port and the outlet port of the hydraulic fluid; a drive shaft, having a distal end and a proximal end, the drive shaft having a drive shaft head defining a cylinder, the cylinder having an internal surface and external surface and being closed in the distal end, with the proximal end defining a sinusoidal surface configured to engage the distal end of the piston, and wherein the distal end of the shaft extends beyond a transmission housing cover disc and is operably coupled to a wheel or a gear and the proximal end of the drive shaft is operably coupled to an encoder; an encoder centrally coupled to the transmission housing base disc and coupled to the elliptical drive shaft; a transmission housing cover disc, coupled to the distal end of the cylindrical transmission housing; a plurality of servo motors, each operably coupled to the cylindrical transmission housing; means for converting each servo motor's rotational motion to reciprocating linear motion, the conversion means operably coupling each spool valve to each servo motor; and a control module, configured to receive input from a plurality of sensors and engage a predetermined number of actuators at a predetermined location along the periphery of the cylindrical transmission housing, the location of the pistons configured to impart continuous radial motion to the drive shaft head, wherein the number of piston engaged depends on the input received from the plurality of sensors.

A person skilled in the art would recognize that the hydromechanical sCVTs described herein can be used as reciprocating pumps as well as a motor and therefore, the embodiments of the hydromechanical, Semi Continuously Variable Transmission (sCVT), assemblies disclosed are used interchangeably with semi Continuous Variable Displacement Motor (sCVDM), semi Continuous Multiplex Reciprocating Pump (sCMRP).

The displacement per revolution of the hydromechanical sCVT described herein can be controlled using the volume defined by the bores defining a displacement part. Each part is comprised of a cylinder defined by the bore, where the number of cylinders can depend on volume of displacement required per revolution and sCVT performance in terms of torque vs. motor speed. The cylinders can be located around (radial) or along (axial) the drive shaft, for example, an elliptical wheel disposed as the head of the drive shaft in the radial configuration transmission case, and can be controlled, monitored and operated by, for example, a transmission CPU (central processing unit, which can be either electronic and/or mechanical), each cylinder can comprise a piston; wherein; by adding or reducing the number of working pistons in an operation cycle, the displacement per revolution will change and transmission ratio between the motor and wheels or gears can be set accordingly.

The transmission ratio between engine (in other words, a jet engine, a hydraulic motor, an electric motor, internal combustion engine and/or hybrid or a combination comprising at least one of the foregoing) and the wheels or gears coupled thereto can be continuously changed by discretely varying the number of working pistons in an operation cycle whereby the desired ratio can be set at any given moment. For example; in circumstances where the highest transmission ratio is required (high speed, low torque), the hydromechanical sCVT can use the minimum number of pistons to set the desire ratio of the transmission's drive shaft head (e.g., a cylindrical drive shaft head defining a sinusoidal lip).

In an embodiment, one operation cycle is considered to be 360° (degrees) rotation of sCVDM's or sCMRP's drive shaft head, and each piston can contribute to the rotation of the transmission's drive shaft head (e.g., an elliptical drive shaft head, or cylindrical drive shaft head defining a sinusoidal lip) causing the shaft to rotate a given number of degrees. To calculate the minimum pistons required to complete a revolution, 360° can be divided by the degrees of rotation imparted by a single piston stroke. The minimum number of pistons, operating sequentially (in other words, one after the other), will rotate the sCVDM's or sCMRP's drive shaft one cycle and so on.

In circumstances where the lowest ratio is needed (e.g., upon start of motion from a standing position), the sCVT's CPU, according to a predetermined programming plan, will cause all the pistons in the working zones to operate, to achieve maximum torque. The sCVT's CPU can be configured operate the pistons in a sequential manner with smallest possible intervals, the value of intervals in degrees can be calculate by dividing 360 degrees by the number of pistons in the hydromechanical sCVT.

In an embodiment, in the sCVT's operation, the transmission ratio can shift from highest ratio to lowest ratio or any desire ratio in between at the same time as continuously variable ratio (in other words; to set the desire ratio there is no need to traverse all the way from lowest to the highest ratio, but rather, the desired ratio is achieved in a single operation).

The hydromechanical sCVT can have several sub-assemblies. for example:

Hydraulic power supply sub-assembly, which can comprise a pump (e.g. sCMRP), and all hydraulic pipes and connections. The pump can be mounted on, for example, the engine body or the chassis and be operably coupled to the engine's drive shaft, either directly or through various transfer gears (e.g., spur gear, beveled gears, planetary gears and the like). The hydraulic pump can be a positive displacement pump, a diaphragm pump or other, similarly effective high-pressure pumps.

Bypass sub-assembly, which can comprise a subassembly divert valve operated by the sCVT's CPU for example, when the vehicle comprising the hydromechanical sCVT is stopped on a flat road and the engine is kept idle.

Hydraulic accumulator sub-assembly, which can comprise pressure tanks, hydraulic actuators (e.g., bladder, diaphragm bladder, piston (either spring or gas controlled) and/or metal bellows) and pipes, which can accumulate the vehicle's acceleration energy when the vehicle comprising the hydromechanical sCVT moves downhill or when the vehicle's operator operates the vehicle's braking system, whereby the subassembly returns this energy back to the hydromechanical sCVT. Hydraulic pressure fluctuations can also result from pump ripple, opening/closing of valves, actuators bottoming out and so on. The selection and design characteristics of accumulators can vary between the applications. For example, the hydraulic accumulator tank can comprise a housing (e.g., cylindrical tank) with a septum separating the hydraulic fluid side and the compressible gas side (for example, dry nitrogen because of its low thermal expansion properties). The accumulator can have a predetermined gas pressure and the hydraulic system can often be used to manipulate the pressure of the oil used in the accumulator depending upon a specific application. Rapid increases and decreases of hydraulic power demands (occurring for example, during acceleration resulting from lane shift when bypassing another vehicle, or upon braking) can shock the hydraulic pump, lines and valves. Open-center systems using, for example positive-displacement pump (in other words, systems that constantly provide hydraulic flow while the engine is running) must return to sump (e.g., a reservoir) when there is no hydraulic need. This can be done, for example, by use of a relief valve or a 'dump'-valve on the pressure side of the system.

Spool Valve as Hydraulic distributor, which can supply the hydraulic flow according to the operation cycle, to the working cylinders in the sCVT module. The hydraulic distributor can be used for distributing the flow of the hydraulic fluid supplied from the pump to a receiver, such as the hydromechanical sCVT, during, for example, starting, stopping, or reversing of the hydraulic sCVT. The hydraulic distributors can be of the cock, slide-valve, or valve type and may have direct (e.g., manual/mechanical) or remote (e.g., hydraulic, pneumatic, electric) controls.

Elliptical/square or cylindrical drive shaft head defining a sinusoidal lip supervisor, which can be used to monitor the precise position of the elliptical/square/sinusoidal lip drive shaft head during the operation cycle. The supervisor used can be, for example, a mechanical supervisor comprised of a mechanical cam shaft coupled to the drive shaft head, or an electrical supervisor comprised of an electronic Encoder connected to the drive shaft head. The encoder can rotate with the drive shaft head, detects the rotation condition of the drive shaft head and then can provide the hydromechanical sCVT's CPU with a signal that indicates the rotation condition, in other words, a pulse signal for acquiring a count value (encoder count) corresponding to the amount of movement (rotation amount) of the drive shaft head. Upon acquiring the signal from the encoder, the hydromechanical sCVT's CPU can control the number of cylinders/pistons and their engagement location around the drive shaft head, ensuring the vehicle operates along the ideal operating line (in other words, on the line optimizing engine torque as a function of vehicle velocity), thus minimizing fuel consumption.

Tire grip valve sub-assembly, which can be coupled to the hydraulic line of each of wheel and which can monitor the hydraulic pressure according the load balance on each wheel shaft. The tire grip valve can control the hydraulic pressure in the line from fully open until the line is closed.

Oil reservoir and filtration container sub-assembly, which can be adapted to receive the hydraulic oil after operation, filter, cool and prepare the oil for next operation.

Control box and operation system sub-assembly, comprising a CPU (central processing unit), and other electrical circuits and electronic components configured to receive data from all sensors (e.g., fluid pressure, encoder count and position, velocity, load/wheel etc.), process the information and operate the hydromechanical sCVT module in accordance with road conditions and programming software.

Sensors. The sCVT system can include several sensors to receive data from vehicle system. The sensors can be, for example, pressure gauge in several locations along hydraulic system described. Likewise, sensors for Engine/Wheel RPM, encoder-position of the elliptical/square drive shaft head, RPM of the hydromechanical sCVT's or sCVDP's shaft, position of gas pedal and acceleration. Other sensors used in the systems and methods provided, can be a torque load sensor coupled to each wheel's shaft (positive or negative depending on the direction of rotation), position of drive gear handle, position of steering drive system or a combination of the foregoing sensors.

The hydromechanical sCVT module, referring to a hydraulic motor or pump with discrete displacement per revolution, capable of providing a variable transmission ratio at any hydraulic pressure supplied by a pump coupled to the engine of the vehicle. module can operate sCVDM or sCMRP.

In an embodiment, provided herein is a hydromechanical, semi continuously variable transmission (sCVT), comprising: a transmission housing base disc, comprising an inlet port for a hydraulic fluid; a cylindrical transmission housing having a proximal axial end and a distal axial end, and an internal radial surface and external radial surface, the transmission housing defining a plurality of bores disposed radially at the distal axial end, wherein the proximal axial end is operably coupled to the transmission housing base disc; a plurality of valve housing each having a proximal axial end and a distal axial end disposed axially above the plurality of bores defined in the transmission housing, the valve housing having an inlet port and an outlet port and being in fluid communication with a hydraulic pump and operably coupled to an actuator; a plurality of pistons, each slidably coupled within the bore defined in the periphery of the cylindrical transmission housing having a proximal end and a distal end, wherein the proximal end extends into the internal radial surface of the cylindrical transmission housing, configured to engage a drive shaft; a plurality of valves, each disposed within the valve housing, the valve operably coupled to an actuator and configured to regulate fluid communication between the distal end of the piston and the hydraulic fluid by exposing or blocking the inlet port and the outlet port of the hydraulic fluid; a drive shaft, having a distal end and a proximal end, the drive shaft having an elliptical head having a longitudinal axis and a transverse axis perpendicular to the longitudinal axis disposed at the proximal end of the drive shaft, wherein the distal end extends beyond a transmission housing cover disc and is operably coupled to a wheel or a gear and the proximal end is operably coupled to an encoder; an encoder centrally coupled to the transmission housing base disc and coupled to the elliptical drive shaft head; a transmission housing cover disc, coupled to the distal end of the cylindrical transmission housing; a plurality of actuators, each operably coupled to the valve; and a control module, configured to receive input from a plurality of sensors and engage a predetermined number of pistons at a predetermined location along the periphery of the cylindrical transmission housing, the location of the actuators configured to impart continuous radial motion to the drive shaft head, wherein the number of piston engaged depends on the input received from the plurality of sensors.

Alternatively, and in another embodiment, provided herein is a hydromechanical, semi continuously variable transmission (sCVT), comprising: a transmission housing base disc, comprising an inlet port for a hydraulic fluid; a cylindrical transmission housing having a proximal axial end and a distal axial end, and an internal radial surface and external radial surface, the transmission housing defining a cylindrical space, configured to receive a plurality of axially oriented pistons, wherein the proximal axial end is operably coupled to the transmission housing base disc; a plurality of spool valve housing each having a proximal axial end and a distal axial end disposed radially, the spool valve housing having an inlet port and an outlet port and being in fluid communication with a hydraulic pump and operably coupled to an actuator; a plurality of axially oriented pistons, each slidably coupled within the cylindrical space defined in the periphery of the cylindrical transmission housing having a proximal end and a distal end, wherein the proximal end extends into the internal axial surface of the cylindrical transmission housing, configured to engage a drive shaft head; a plurality of spool valves, each disposed within the spool valve housing, the valve operably coupled to an actuator and configured to regulate fluid communication between the distal end of the piston and the hydraulic fluid by exposing or blocking the inlet port and the outlet port of the hydraulic fluid; a drive shaft, having a distal end and a proximal end, the drive shaft having a drive shaft head defining a cylinder, the cylinder having an internal surface and external surface and being closed in the distal end, with the proximal end defining a sinusoidal surface configured to engage the distal end of the piston, and wherein the distal end of the shaft extends beyond a transmission housing cover disc and is operably coupled to a wheel or a gear and the proximal end of the drive shaft is operably coupled to an encoder; an encoder centrally coupled to the transmission housing base disc and coupled to the elliptical drive shaft; a transmission housing cover disc, coupled to the distal end of the cylindrical transmission housing; a plurality of servo motors, each operably coupled to the cylindrical transmission housing; means for converting each servo motor's rotational motion to reciprocating linear motion, the conversion means operably coupling each spool valve to each servo motor; and a control module, configured to receive input from a plurality of sensors and engage a predetermined number of actuators at a predetermined location along the periphery of the cylindrical transmission housing, the location of the pistons configured to impart continuous radial motion to the drive shaft head, wherein the number of piston engaged depends on the input received from the plurality of sensors.

Also, provided herein is a method of modulating the ratio between a motor's drive shaft and the wheel or gear operably coupled to the motor, the method comprising the steps of: coupling the motor drive shaft to a hydraulic pump; couple the hydraulic pump to a hydromechanical, sCVT (semi-continuous variable transmission) module by hydraulic pipes; coupling the hydromechanical sCVT to a gear or a wheel, whereby the hydromechanical sCVT module is configured to rotate a drive shaft coupled to the gear or wheel using hydraulic fluid pumped by the hydraulic pump to actuate a plurality of pistons disposed radially around the drive shaft head; and, by adding or reducing the number of working pistons per revolution of the hydromechanical, sCVT module's drive shaft head, continuously varying the flow of the hydraulic fluid by discrete variable displacement per revolution, thereby changing the volume of displacement per revolution and modulating the ratio between a motor's drive shaft revolutions per minute and the revolutions per minute of a wheel or gear operably coupled to the motor.

A more complete understanding of the components, processes, and devices disclosed herein can be obtained by reference to the accompanying drawings. These figures (also referred to herein as "FIG.") are merely schematic representations based on convenience and the ease of demonstrating the presently disclosed devices, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Turning now to FIG. 1 showing an exploded view of an embodiment of the radial piston orientation of the hydromechanical sCVDM or sCMRP module 100 described. FIG. 1 shows transmission housing base disc 110, comprising an inlet port 117 for a hydraulic fluid; a cylindrical transmission housing 101 having a proximal axial end and a distal axial end, and an internal radial surface and external radial surface, the transmission housing 101 defining a plurality of bores $102_i$ disposed radially on transmission housing 101. Bores $102_i$ can be arranged in an array rather than in a single radial row, whereby the array comprises a plurality of rows arranged radially around housing 101; and wherein each row can either be axially aligned or offset with respect to other rows of bores $102_j$.

Plurality of valve housings $105_j$ each $j^{th}$ housing having a proximal axial end and a distal axial end can be disposed axially with respect to the valve housing 105 above and aligned with the plurality of bores $102_i$ defined in the transmission housing 101. Each $j^{th}$ valve housing $105_j$ can be configured to have an inlet port 114 and an outlet port 113 maintained in fluid communication with a hydraulic pump (not shown, See e.g., FIG. 12) and operably coupled to actuator cylinder member $602_n$, which extends through apertures $116_m$ defined in transmission housing base disc 110. A plurality of pistons $300_p$ (showing only 3 of 28), each $p^{th}$ piston slidably coupled within $i^{th}$ bore $102_i$ defined in the periphery of the cylindrical transmission housing 101, wherein the proximal end of piston $300_p$ extends into the internal radial surface of cylindrical transmission housing 101, configured to engage drive shaft 500 with drive shaft head 501.

A plurality of valves $200_q$, (showing one spool valve embodiment) each $q^{th}$ valve being slidably disposed within $j^{th}$ valve housing 105, each $q^{th}$ valve $200_q$ can be operably coupled to the $n^{th}$ actuator cylinder member $602_n$ and be configured to regulate fluid communication between the distal end of the $p^{th}$ piston $300_p$ and the hydraulic fluid by exposing or blocking the inlet port 114 and the outlet port 113 of the hydraulic fluid. Also shown in FIG. 1, is means 620 for converting each $n^{th}$ servo motor's $601_n$ rotational motion to reciprocating linear motion. Means 620 comprising cylindrical cap 623 having pin 625 disposed axially at the closed distal end, and configured to engage spool valve $200_q$.

Drive shaft 500, having a distal end and a proximal end, can have an elliptical or square head 501 disposed at the proximal end of drive shaft 500, wherein the distal end extends beyond transmission housing cover disc 111 and can be operably coupled to a wheel or a gear (not shown see e.g., FIG. 20) and the proximal end is operably coupled to encoder 400.

Encoder 400 can be centrally coupled to the transmission housing base disc 110 and coupled to the elliptical or square (see e.g., FIG. 11) drive shaft head 501.

Transmission housing cover disc 111, can be coupled to the distal end of the cylindrical transmission housing 101. In addition, a plurality of actuators cylinder member $602_n$, each $n^{th}$ actuator can be operably coupled to each $q^{th}$ valve of valve $200_q$.

FIG. 1 also shows mounting brackets 118, oil outlet ports 119 in transmission housing cover disc 111, seal 109, disposed between the proximal end of transmission housing 101 and transmission housing base disc 110, with bearing 112 that can be used for operably coupling drive shaft head 501 to encoder 400.

Figure 3:
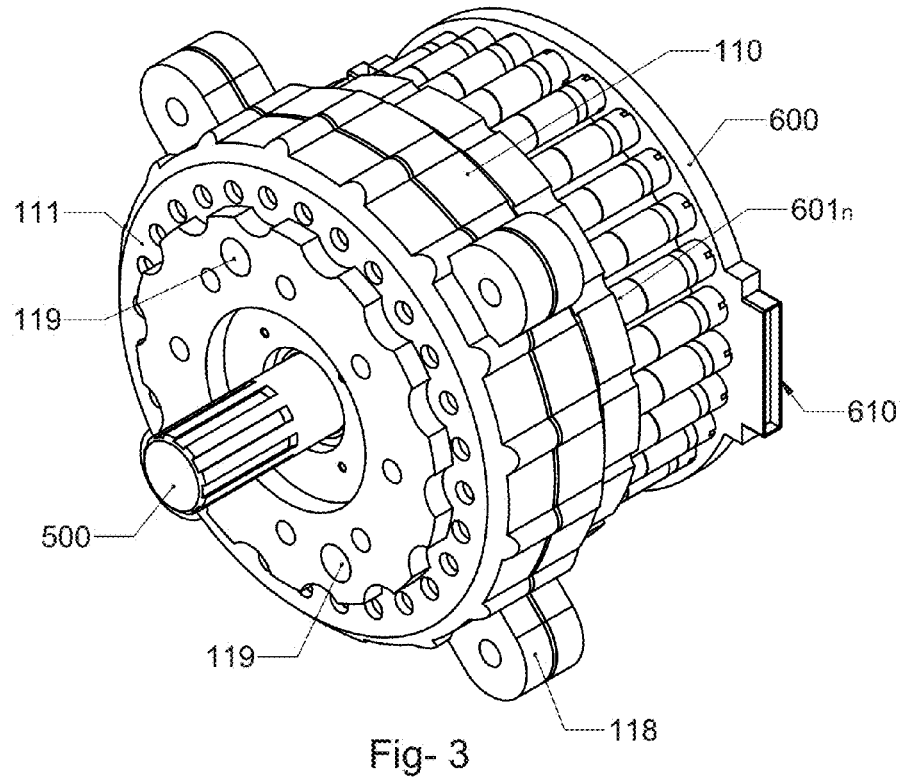
FIG. 3 illustrates an isometric front view of an embodiment of the radial piston orientation of the hydromechanical continuous variable transmission.
Figure 4:
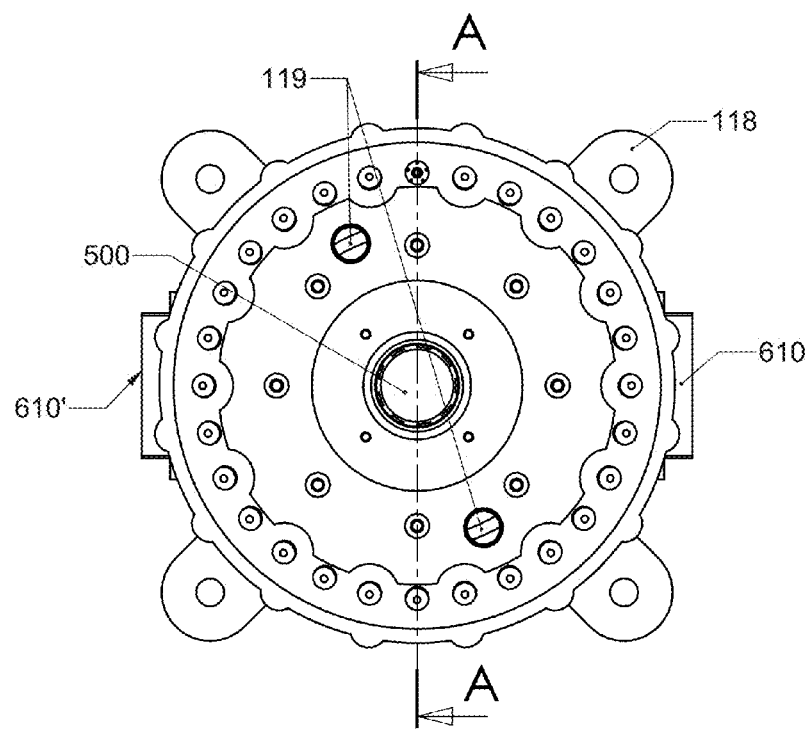
FIG. 4 illustrates a front view of an embodiment of the radial piston orientation of the hydromechanical continuous variable transmission.

Turning now to FIGS. 2-5, showing a rear (FIG. 2) and front (FIG. 3) view of assembled embodiment of the radial piston orientation of hydromechanical sCVDM or sCMRP module 100, showing transmission housing base disc 110 and transmission housing cover disc 111, with electric plug 610 (and 610'). As shown, actuator valves sub-assembly 600 (FIG. 2) can comprise valve (e.g., rotating valves or spool valves) actuators $601_n$, radially disposed and operably coupled to valve housing $105_j$, with encoder 400 visible (FIG. 2) and hydraulic fluid inlet port 117 being in fluid communication with each inlet port 114 of the $j^{th}$ valve housing $105_j$ (not shown, see e.g., FIG. 1). Likewise FIG. 3 shows the distal end of drive shaft 500 protruding beyond transmission housing cover disc 111, which define hydraulic fluid outlet ports 119. sCVDM or sCMRP module 100 can be mounted onto, for example a wheel shock absorber sub-assembly using mounting brackets 118. The location of mounting brackets 118, as well as their number, shape, size and other parameters can be altered to ensure proper attachment of sCVDM or sCMRP module 100 to a gear or a wheel.

Figure 6A:
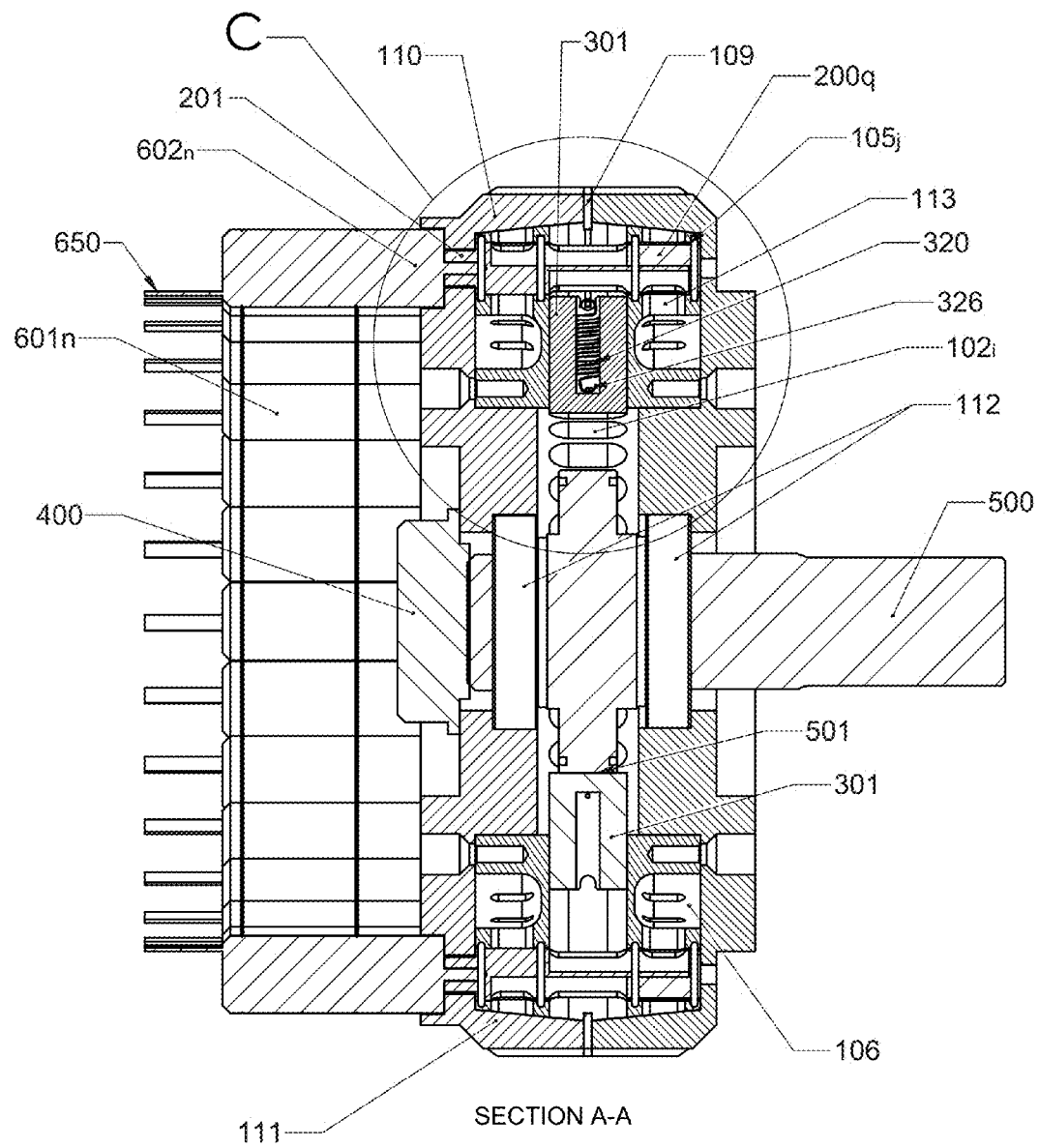

Turning now to FIG. 6, showing in FIG. 6A in a greater detail, a cross section of a front view of the hydromechanical sCVT 100, along Y-Z plane, wherein valve actuators (e.g., servo motors) $601_n$, radially disposed and operably coupled to valve housing $105_j$, each $j^{th}$ housing having a proximal axial end and a distal axial end can be disposed axially with respect to the valve housing 105 with rotating valves $200_q$ being operably coupled within housing $105_j$ configured to spin above piston 301 exposing or blocking inlet port 114 or outlet port 113 (not shown, see e.g., FIG. 1) synchronously with the motion of the $p^{th}$ piston (e.g., 301). As shown, plurality of pistons $300_p$, each $p^{th}$ piston (e.g., 301) being slidably coupled within $i^{th}$ bore $102_i$ (not shown, see e.g., FIG. 1) defined in the periphery of the cylindrical transmission housing 101 (not shown, see e.g., FIG. 1), wherein the proximal end of piston 301$_p$ extends into the internal radial surface of cylindrical transmission housing 101, configured to engage drive shaft 500 with drive shaft head 501. FIG. 6A also shows encoder 400 centrally coupled to the transmission housing base disc 110 with seal 109, encoder 400 operably coupled to the elliptical or square drive shaft head 501. Also shown in FIG. 6A is biasing means 320 disposed between upper boss 325 and lower boss 326, configured to bias piston 301 away from drive shaft head 501, when the piston is not engaged by actuator 601$_n$ via encoder 400.

Figure 6B:
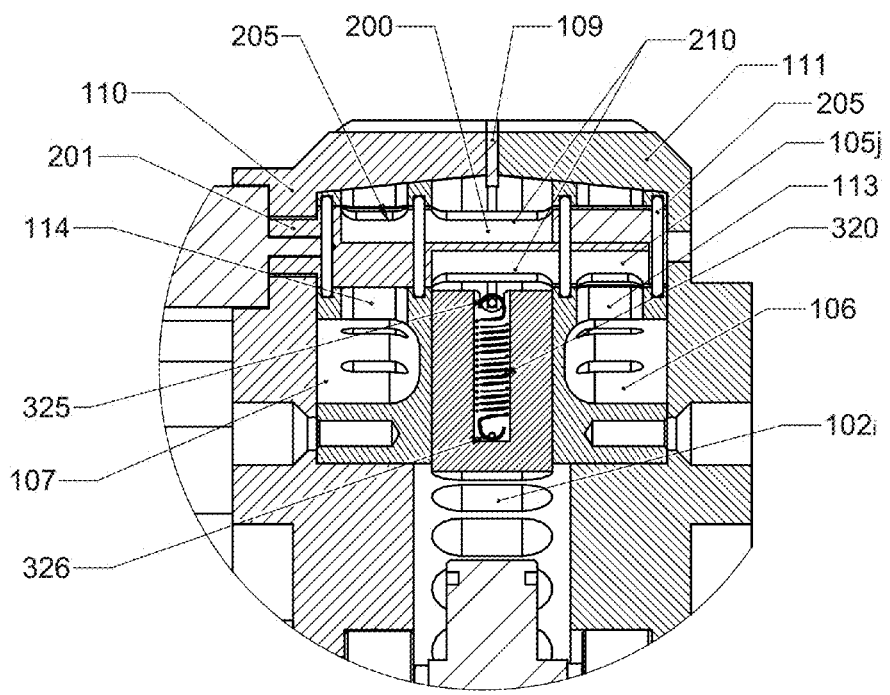

As illustrated in FIG. 6B, valve actuators 601$_n$ (e.g., servo motor, see e.g., FIG. 19A) are located on each head of piston 300$_p$ housing and can comprise a rotating valve cylinder 200$q$, (see e.g., FIG. 6C), $q^{th}$ rotating valve operate by electric relay actuator or electric motor actuator cylinder member 602$_n$, this rotating valve assembly control the inlet port 114 and outlet ports 113 of valve housing 105$_j$. As illustrated, rotating valve 200 comprises proximal end 201 configured to mate with the distal tip of actuator cylinder member 602$_n$, and distal end 202 configured to rotate within housing 105$_j$, with surface curves 203 and 204 defining the gates configured to block or open inlet port 114 and outlet port 113 the valve actuators assembly 600 can operate in three modes: (1) inlet port 114 opened and outlet port 113 closed, (2) inlet port 114 closed and outlet port 113 opened, (3) inlet 114 and outlet 113 ports are closed, whereby, in the third mode (3) valve 200$_q$ can be located between two other modes, when valve assembly transitions from any mode to any other, the transition passes through the third mode. FIG. 6B also illustrates valve head 201 of rotating valve 200, with seal distal end 202. Hydraulic pressure outlet tube 106 is coupled to each outlet port 113, while hydraulic fluid inlet tube 107 is coupled to inlet port 114. Electronic actuator valve connecting point 201 abuts actuator cylinder member 602$_n$, coupled to transmission housing cover disc 111. O-ring 205 can be disposed on rotating valve 200, to provide a proper seal between valve actuator 200 and housing 105.

Figure 6C:
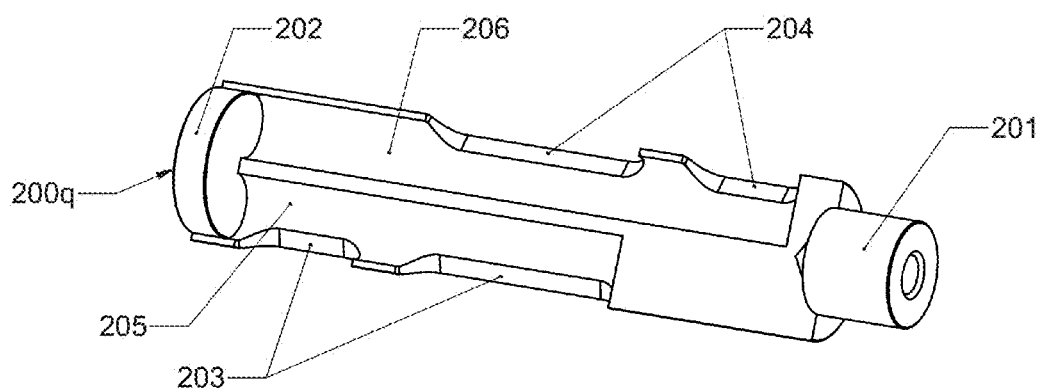

FIG. 6C illustrates an embodiment of a rotating valve 200, that can be used in sCVDM or sCMRP module 100 provided herein, showing tip 201 configured to engage actuator cylinder member 602$_n$. Rotary valve 200 can consist of a rotating spool 200 which via curved surfaces 203 and 204 align with inlet port 114 or outlet port 113 in the valve housing 105$_j$ to give the required operation. In an embodiment, creating the corresponding two (or more) bores allows operation of the valve with minimal hydraulic losses. O-ring 205, (FIG. 6B) seals the inlet from outlet port, thus, when closed, there are less hydraulic losses (leaks).

Figure 6D:
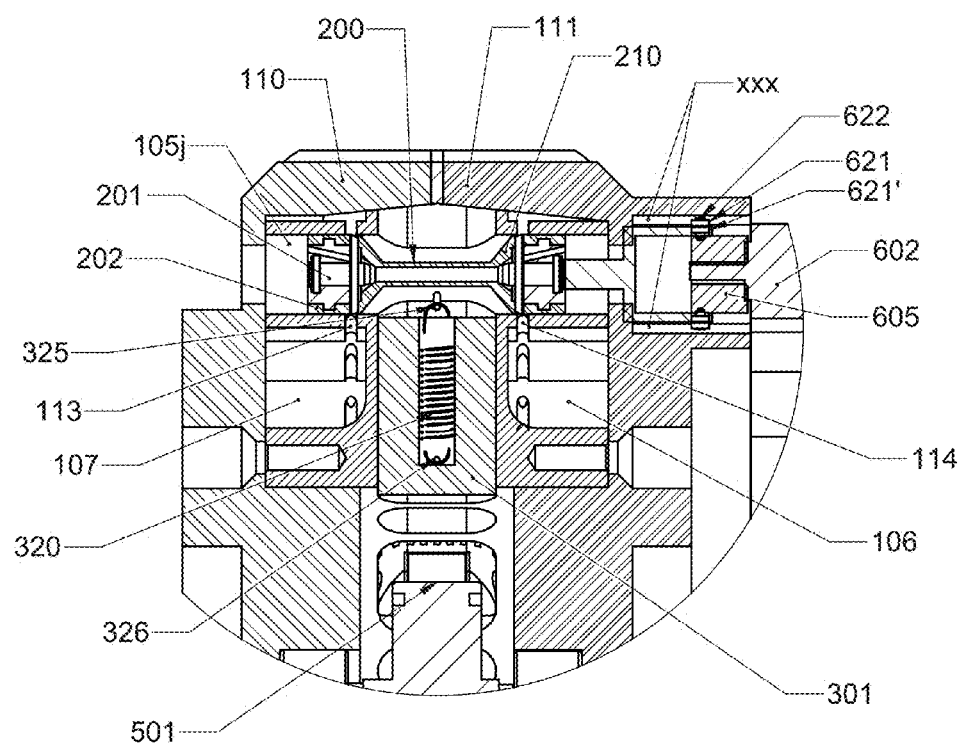

An alternative linear spool valve is illustrated in FIG. 6D, where spool valve(s) 200$_q$ are located on each head of piston 300$_p$ housing 105$_j$ and can comprised a valve cylinder 200$q$, (see e.g., FIG. 1) and double pistons connected by hollow bar, the pistons operate by electric relay actuator or electric motor actuator cylinder member 602, this valve assembly control the inlet port 114 and outlet ports 113 of cylinder, the valve 200 can operate in three modes: (1) inlet port 114 opened and outlet port 113 closed, (2) inlet port 114 closed and outlet port 113 opened, (3) inlet 114 and outlet 113 ports are closed, whereby, in the third mode (3) valve 200 pistons can be located between two other modes, when valve assembly transitions from any mode to any other, the transition passes through the third mode. The valve actuators assembly 600 can act as electric hydraulic distributor. FIG. 6D also illustrates piston head 201 of spool valve 200 and air passages 210, disposed within hollow valve actuator 200. Hydraulic pressure outlet tube 106 is coupled to each outlet port 113, while hydraulic fluid inlet tube 107 is coupled to inlet port 114.

Electronic (or servo motor) actuator cylinder member 602 valve connecting point 201 abuts actuator cylinder member 602$n$, coupled to transmission housing cover disc 111. O-ing 205 can be disposed on piston distal end 202 of valve actuator 200, to provide a proper seal between valve actuator 200 and housing 105.

Figure 5:
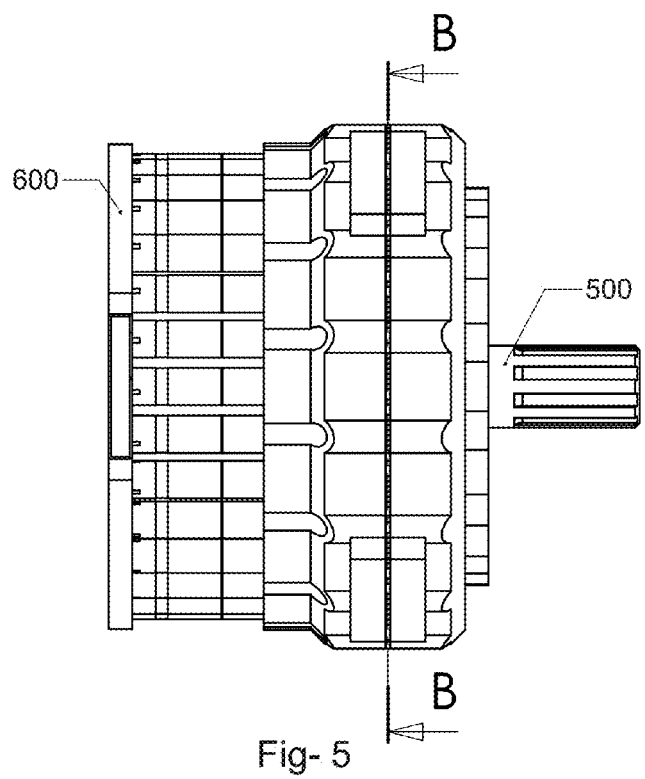
FIG. 5 illustrates view of an embodiment of the radial piston orientation of the hydromechanical continuous variable transmission.
Figure 7:
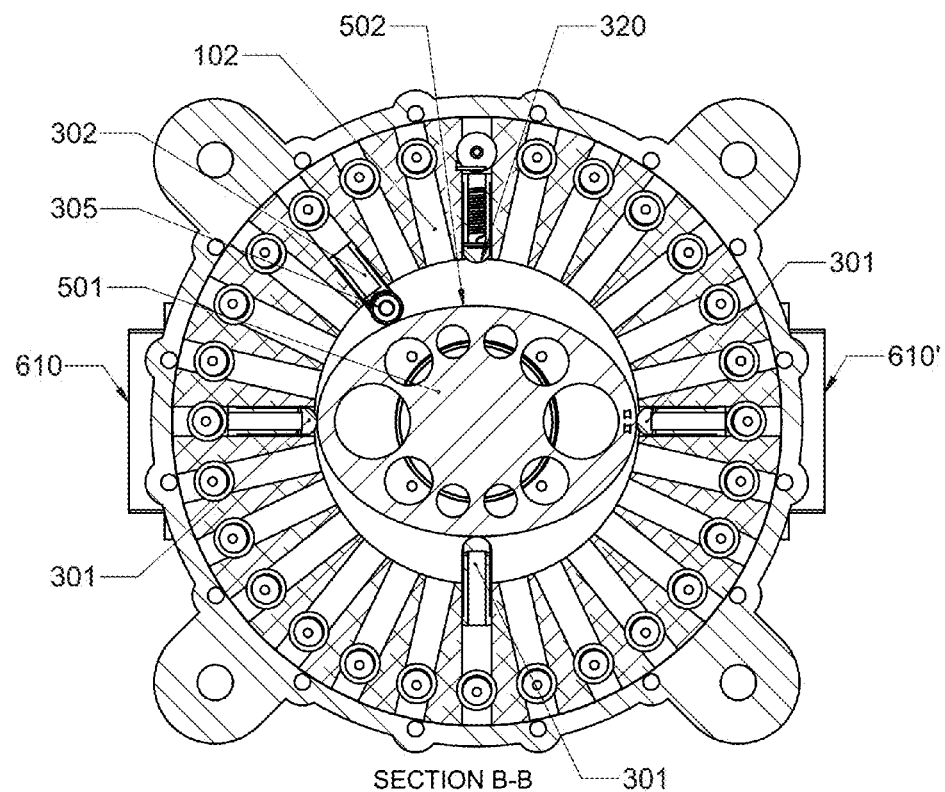
FIG. 7 illustrates a cross section of an embodiment of the radial piston orientation of the hydromechanical continuous variable transmission taken along section B-B of FIG. 5.

Turning now to FIG. 7, showing in a greater detail, cross section B-B of FIG. 5, a side view of sCVDM or sCMRP module 100, with the radial piston orientation wherein pistons 300$_p$ are radially disposed around elliptical (see e.g., FIG. 9A) or square (see e.g., FIG. 11) drive shaft head 501. In the shown embodiment, two types of pistons 300$_p$ are shown, "regular" type having an elliptical cross section that by arranging the pistons with the narrow aspect radially can enable increasing the number of pistons per diameter of sCVDM or sCMRP module 100. Piston type A 301 and Piston type B 302 are further illustrated in FIGS. 8A and 8B. Pistons 300$_p$ slidably move in a reciprocating manner (referring to a movement where the piston repeats its position) within bore 102$_i$. Also shown in FIG. 7, are electric plugs 610 used to couple sCVDM or sCMRP module 100 to the vehicle's CPU. Two types of pistons are shown in FIG. 7, Piston type B 302 with a roller bearing to reduce friction with drive shaft head 501, and piston type A 301, without. As shown piston 302 type B is at 3 o'clock and another, at 12 o'clock. Pistons 301 type A are shown at 6, 9, and 11 o'clock. Turning now to the position of the pistons in the operation cycle as illustrated for example in FIG. 7; piston 302 at 12 o'clock as shown is in discharge position (see e.g., FIG. 11) based on the spin direction of elliptical drive shaft head 501. Piston 301 type A at 12 o'clock shown with biasing means 320 is at a hold position, held away from drive shaft head 501 with biasing means 320 and does not participate in turning drive shaft head 501. Piston 302 type B at 3 o'clock and piston 301 type A at 9 o'clock, are in a transient zone (see e.g., 503, FIGS. 9A, 9B) of the major axis of elliptical drive shaft head 501. Based on the control system (CPU), these pistons completed the discharge operation and are now available to further participate in the operation cycle, or remain in a hold position. Had these pistons been in hold position, this would have been the point (in other words, at the point where, for example, piston head 305 (see e.g., FIG. 8B) of piston 302 type B is slidably, frictionally coupled to drive shaft head 501) the CPU could have ordered these pistons to initiate their participation in the operation cycle. Similarly, piston 301 type A at 6 o'clock is likewise at the transient zone (see e.g., 504, FIGS. 9A, 9B) of the minor axis of elliptical drive shaft head 501, at which point the piston transforms from a working position to a discharge position.

Turning now to FIG. 8, showing piston 301 in FIG. 8A, having a proximal end configured to provide the surface for the hydraulic fluid work in pressing the piston toward the elliptical or square drive shaft head. Distal end of piston 301 terminates in a solid surface, configured to slidably engage elliptical or square drive shaft head 501 outer surface 502 (see e.g. FIG. 9A) thus rotating drive shaft 500. Alternatively in an embodiment or in addition in another embodiment, as shown in FIG. 8B, piston type B, 302 can comprise in its distal end roller bearing 305 configured to span the width of elliptical or square drive shaft head 501 and reduce the friction between piston 302 and elliptical drive shaft head 501. FIG. 8C shows an embodiment of piston 304 used with the axial configuration of sCVDM or sCMRP module 100, having contact head 306 configured to slidably couple to cylindrical drive shaft head 501 having a sinusoidal lip 502 (see e.g., FIG. 13A). FIG. 8D, shows an embodiment of axial piston 303, having a distal end with bracket 310 and frusto-conical roller bearing 311, whereby the angle defined by frusto-conical roller bearing 311 is configured to assure the wider base of frusto conical roller bearing 311 and the narrower end of the frusto-conical roller bearing 311 rotate at the same speed thus preventing unnecessary friction and heat. Bracket 310 extends longer at the internal wall of cylindrical drive shaft head 501, wherein ball bearing 315 is embedded in the internal arm of bracket 310. The pistons can take any shape so long as they provide hydraulic fluidity during operation.

Frusto conical roller bearing 311 defines a slope that can be calculated whereby the angle is determined by equating the ratio between the external diameter OD (see e.g., FIG. 17B) of cylindrical drive shaft head 501 having a sinusoidal lip 502 having width l (see e.g., FIG. 17A), and the wider base of frusto conical roller bearing 311 and the ratio between the external diameter ID (see e.g., FIG. 17B) of cylindrical drive shaft head 501 having a sinusoidal lip 502 having width l (see e.g., FIG. 17A), and the narrower base of frusto conical roller bearing 311. To obtain the surface angle, either the diameter of the wider base, or the diameter of the narrower base of frusto conical roller bearing 311 will have to be fixed, and can be done based on technical considerations known to those skilled in the art.

Figure 10:
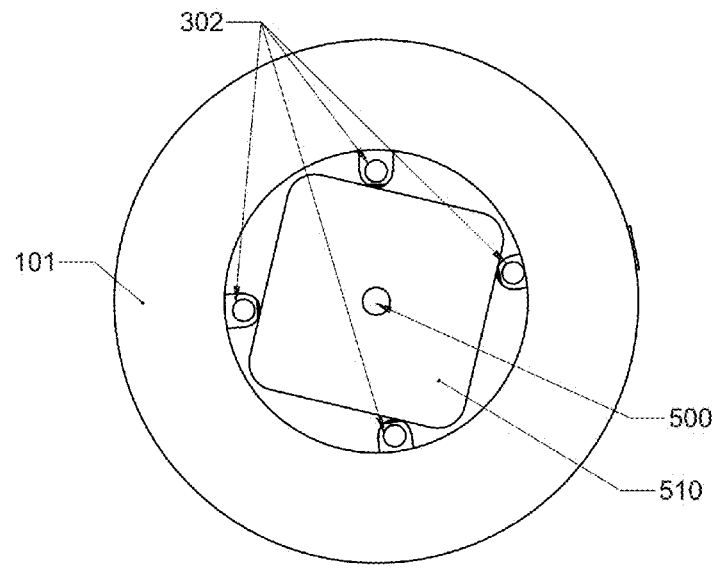
FIG. 10 illustrates an embodiment of a square head of a transmission drive shaft.

Turning now to FIGS. 9-10. As shown in FIG. 9, the major and minor axis at the vertices are shorter and longer respectively (in other words, the major axis at the vertices is shorter and the minor axis at the vertices is longer), and along arcs A 503 and B 504, define a circular arc, rather than parabolic arc 502, with arc 503 length defined by the equation:

$$A = \frac{n_A^\circ}{360} 2\pi r_A \quad (1)$$

wherein:
A is the length of arc 503 at the major axis vertices;
$n_A^\circ$ is the central angle in degrees; and
$r_A$ is the radius of the major axis at the vertices
and arc 504 length defined by the equation:

$$B = \frac{n_B^\circ}{360} 2\pi r_B \quad (2)$$

wherein:
B is the length of arc 504 at the minor axis vertices;
$n_B^\circ$ is the central angle in degrees; and
$r_B$ is the radius of the major axis at the vertices
and where arcs 502 are defined by the ellipsoid function where the angle is 90 degrees. For each major and minor semiaxis, $n_{A,B}^\circ$ can be between about 2° and about 20°.

As illustrated in FIG. 9A it isn't a continuous ellipse shape, wherein the vertices of the ellipse can be radial in shape and not in parabolic shape as described, e.g., in FIG. 7, the radial vertices surfaces can be designed for adjusting transition zones, and the arc length is adapted to alter the functionality of the transition mode, and could be different from one category to another (in other words, earth movers, ATV, pumps, sedans and the like), this can allow the designer greater flexibility to design the transitions modes, and synchronize the spool or rotating valve with elliptical drive shaft head 501 revolutions.

FIG. 10 shows square drive shaft head 510, turned by pistons, for example pistons shown in FIG. 8A, wherein head 510 is operably coupled to drive shaft 500 turning in cylindrical transmission housing 101.

Figure 11:
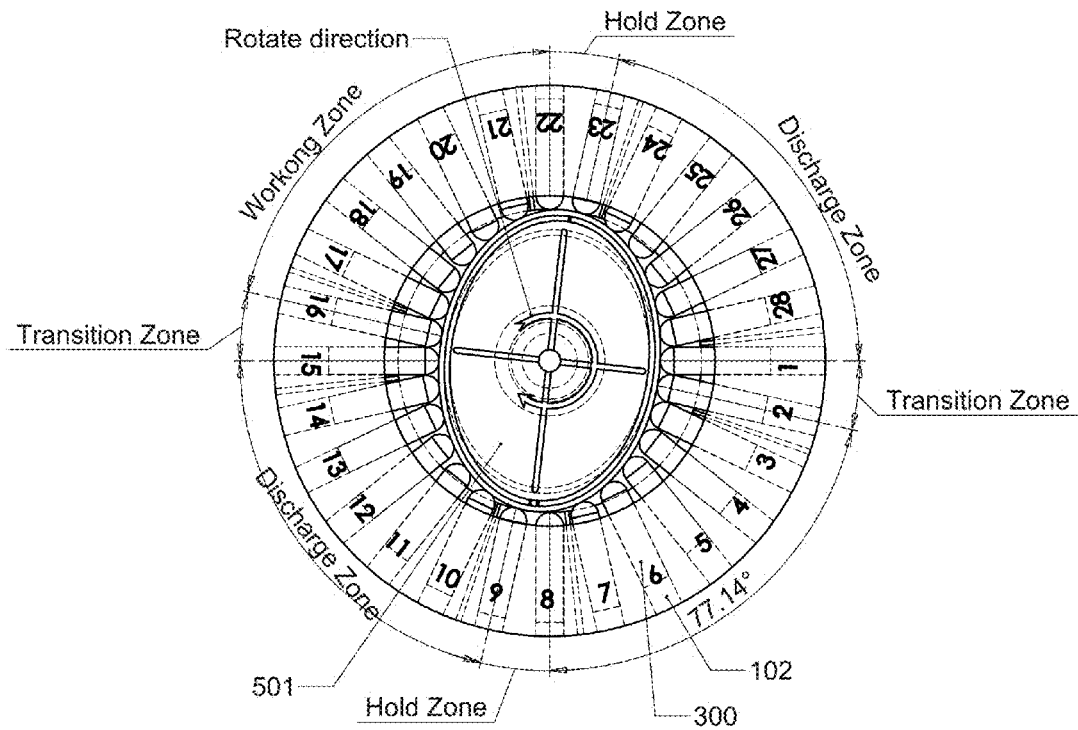
FIG. 11 illustrates spatial and temporal orientation of the pistons in an embodiment of the radial piston orientation of the hydromechanical continuous variable transmission during one operation cycle.
Figure 19:
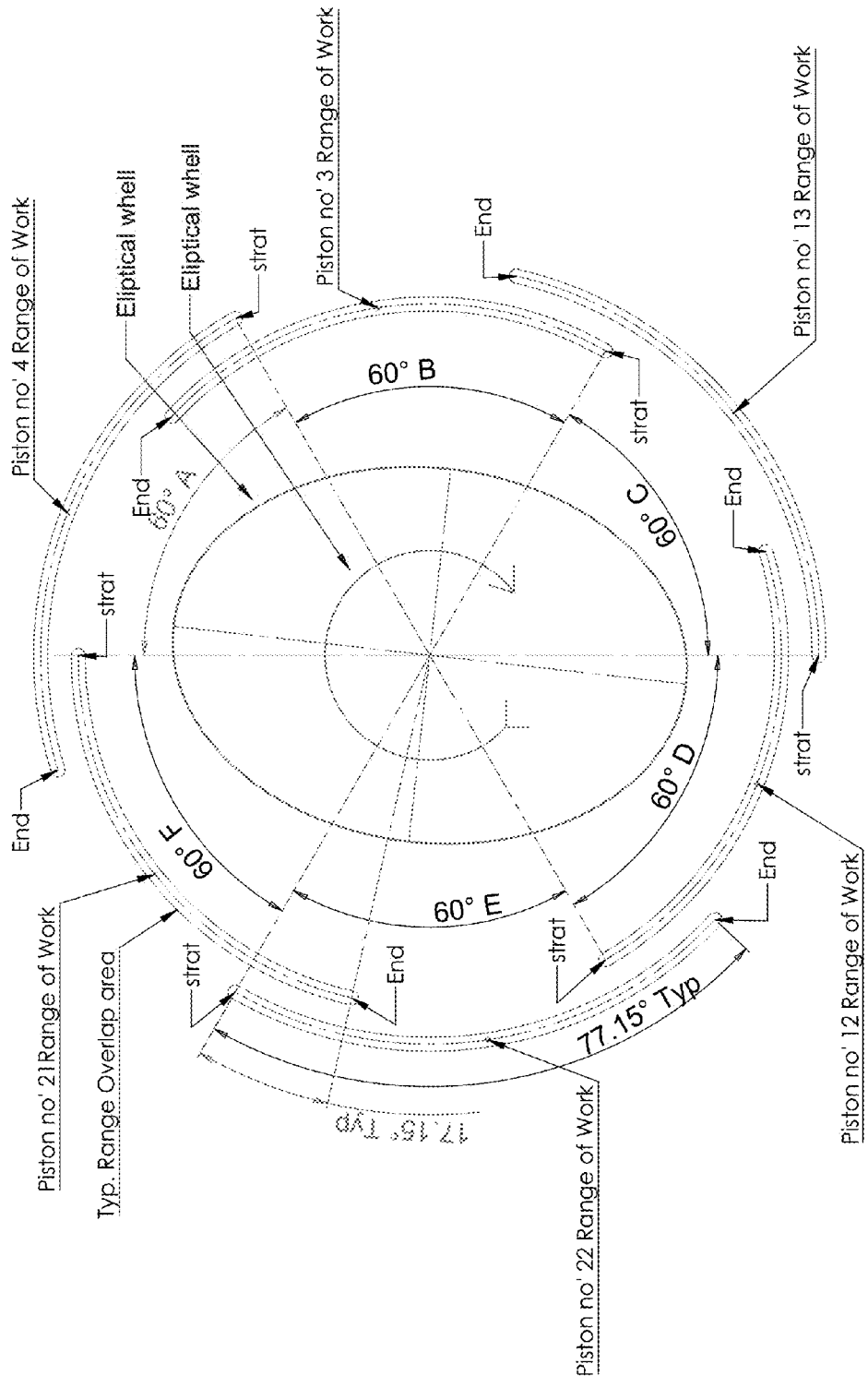
FIG. 19, illustrates a schematic of an operation cycle of the radial piston orientation of the hydromechanical continuous variable transmission.

Turning now to FIGS. 11, and 19, illustrating in FIG. 11, sCVT with 28 pistons and operation zone respectively for each piston, while FIG. 19 illustrates a schematic of sCVT in circumstances with the highest ratio and operational sequence of 6 pistons in the operation cycle of an embodiment of the radial piston orientation of the sCVDM or sCMRP module 100, comprising 28 pistons $300_p$, as shown in FIG. 11, located within bores $102_i$ configured to engage elliptical drive shaft head 501 in a given position, the operation cycle divided to operation zones, working zones, and discharge zones which located sequentially, and 8 transient zones disposed between each of the working and discharge zones. For example, as shown in FIG. 19, operation cycle of elliptical wheel 501 by six (6) pistons $300_p$, each working zone describe by arc, the inner arcs are the first part of working zones the outer arcs are the last part of working zones, the elliptical drive shaft head 501 at given position, and piston No. 21 is the first working piston, the piston forces the elliptical wheel to rotate about 77.15 degrees. After about 60 degrees of elliptical wheel rotation piston No. 12 is actuated an starts working engaging elliptical drive shaft head 501, causing it to rotate, with pistons No.'s 21, and 12, working together along about 17.15 degrees. At the end of the 17.15 degrees piston No. 21 finishes working and piston No. 12 continues rotating elliptical drive shaft head 501. Once elliptical drive shaft head 501 has rotated 120 degrees piston No. 3 start working, again with an overlaps of 17.15 degrees with piston No. 12, with the next working piston No. 22 starts engaging elliptical drive shaft head 501, followed after the next 60 degrees by piston No. 13 with piston No. 4 being that last work to accomplish one operation cycle of elliptical drive shaft head 501.

Figure 12:
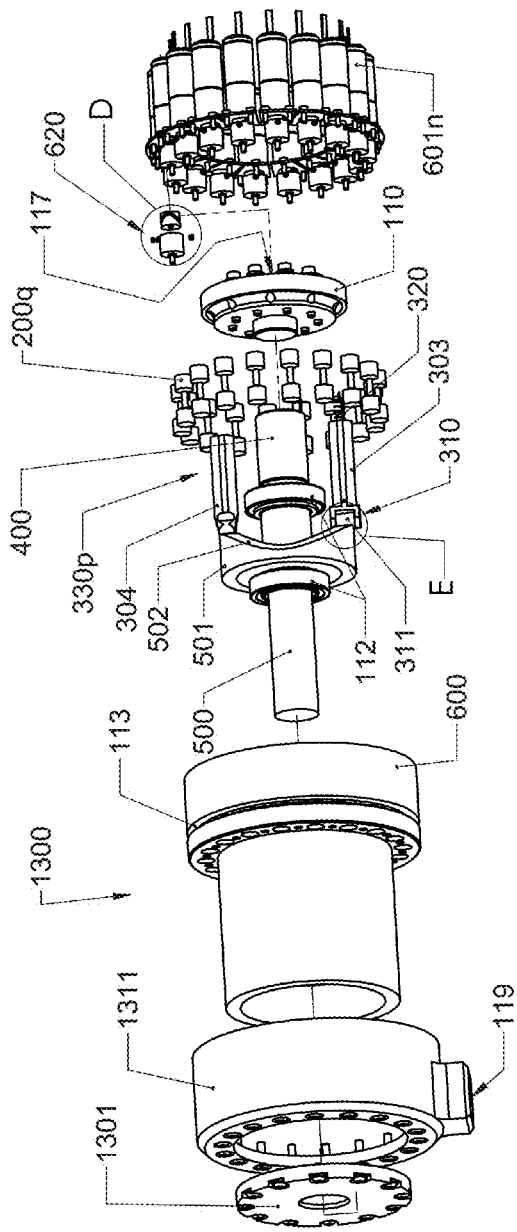
FIG. 12 shows and exploded view of an embodiment of the axial piston orientation of the hydromechanical continuous variable transmission.
Figure 13B:
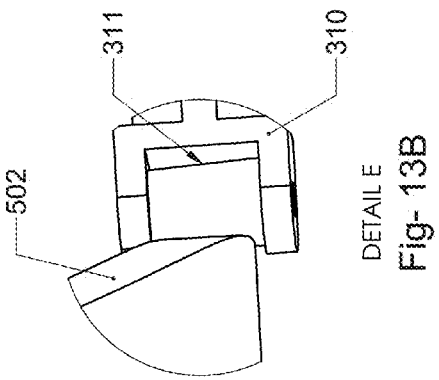
FIGS. 13A and 13B show detail D (FIG. 13A) and detail E (FIG. 13B) illustrated in FIG. 12.
Figure 13A:
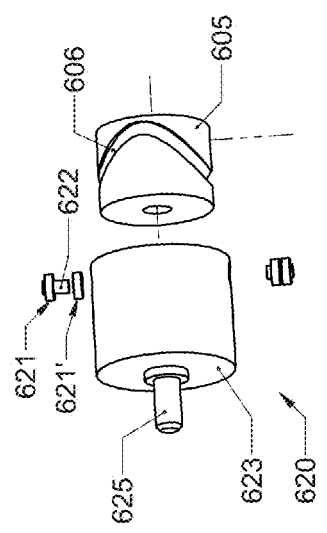

Turning now to FIGS. 12-15, illustrating in FIG. 12, an exploded view of an embodiment of the axial piston orientation of the hydromechanical, semi continuously variable transmission (sCVT) 1300, comprising: transmission housing base disc 110, comprising an inlet port 117 (not shown, see e.g., FIG. 15A) for a hydraulic fluid with cylindrical piston housing 1302 having a proximal axial end and a distal axial end, and an internal radial surface and external radial surface, cylindrical piston housing 1302 defining a cylindrical space, configured to receive a plurality of axially oriented pistons $300_p$, wherein the proximal axial end of the $p^{th}$ piston 303 or 304 (see e.g., FIGS. 8C, 8D, 15B) is operably coupled to transmission housing base disc 110. Plurality of spool valve housing $105_j$ (not shown, see e.g., FIG. 15B), each having a proximal axial end and a distal axial end disposed radially, the spool valve housing having inlet port 117 and radial outlet port 113 being in fluid communication with a hydraulic pump and operably coupled to actuator $601_n$ with plurality of axially oriented pistons $300_p$, each slidably coupled within the cylindrical space defined between the walls of cylindrical piston housing 1302 having internal wall 1303 (not shown, see e.g., FIG. 15B), and each piston (e.g., 304) having a proximal end and a distal end, wherein the proximal end extends into cylindrical piston housing 1302 having internal wall 1303, configured to engage drive shaft head 501. Also shown are plurality of spool valves $200_q$, each disposed within the spool valve housing $105_1$ valve $200_q$ operably coupled to actuator $601_n$ and configured to regulate fluid communication between the distal end of piston 303 and the hydraulic fluid by exposing or blocking inlet radial port 114 and radial outlet port 113 of the hydraulic fluid. Drive shaft 500 illustrated having a distal end and a proximal end, drive shaft 500 having a drive shaft head 501 defining a cylinder, the cylinder having an internal surface and external surface and being closed at the distal end, with the proximal end defining a sinusoidal surface (or lip) 502 configured to engage the distal end of piston 303 or 304, and wherein the distal end of drive shaft 500 extends beyond transmission housing cover disc 1301 and the proximal end of drive shaft 500 is operably coupled to encoder 400. Encoder 400 is centrally coupled to transmission housing base disc 110 and coupled to the drive shaft 500. Transmission housing cover disc 1301, is coupled to the distal end of cylindrical transmission housing 1311. As shown in FIG. 12, plurality of actuators, or servo motors $601_n$, each operably coupled to the cylindrical transmission housing 1311. As illustrated in FIGS. 12 and 13A means for converting each $n^{th}$ servo motor's $601_n$ rotational motion to reciprocating linear motion 620, the conversion means operably coupling each $q^{th}$ spool valve $200_q$ to each $n^{th}$ servo motor (or actuator) $601_n$ Turning now to FIG. 13, illustrating in FIG. 13A, detail D from FIG. 12, showing means 620 for converting each $n^{th}$ servo motor's $601_n$ rotational motion to reciprocating linear motion. Means 620 comprising cylindrical cap 623 having pin 625 disposed axially at the closed distal end, and configured to engage spool valve 200 (not shown, see e.g., FIG. 12) and an open proximal end configured to receive dowel 605 operably coupled to servo motor 601 drive shaft and having sinusoidal groove 606 etched therein, wherein groove 606 is configured to detent member 622 can be coupled to cap 623 with bearing disc 621, and transmission housing's external wall 1302 (see e.g., FIG. 15B). Rotation of dowel 605 with servo motor 601, bearing disc 621 slidably rotates within groove 606. Movement of bearing disc within sinusoidal groove 606 can cause cylindrical cap 623 to reciprocally move axially. To ensure cylindrical cap 623 does not rotate with dowel 605, a double channel is etched into transmission housing's external wall 1302, operably coupled to bearing disc 621, for example, with an additional bearing (not shown).

FIG. 13B illustrates a magnified portion of detail B in FIG. 12, showing an embodiment of axial piston 303, having a distal end with bracket 310 and frusto-conical roller bearing 311, whereby the angle defined by frusto-conical roller bearing 311 is configured to assure the wider base of frusto conical roller bearing 311 and the narrower end of the frusto-conical roller bearing 311 rotate at the same speed thus preventing unnecessary friction and heat. Bracket 310 extends longer at the internal wall of cylindrical drive shaft head 501.

Figure 14A:
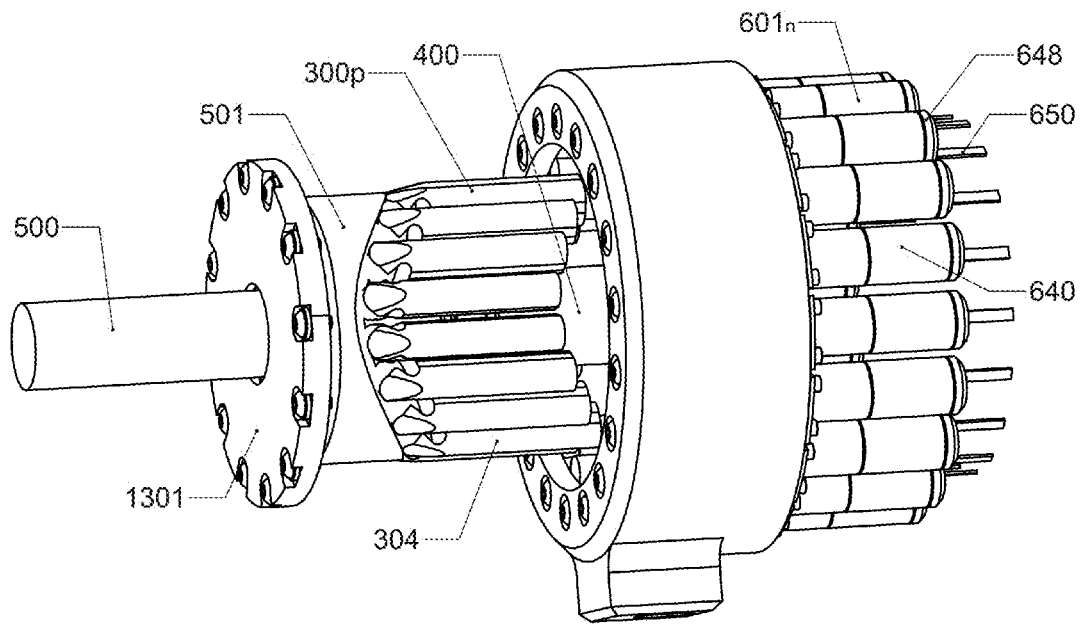
FIGS. 14A and 14B show an isometric front view (FIG. 14A) of an embodiment of the axial piston orientation without the piston housing, and an isometric rear view (FIG. 14B) of an embodiment of the axial piston orientation without the piston housing.
Figure 14B:
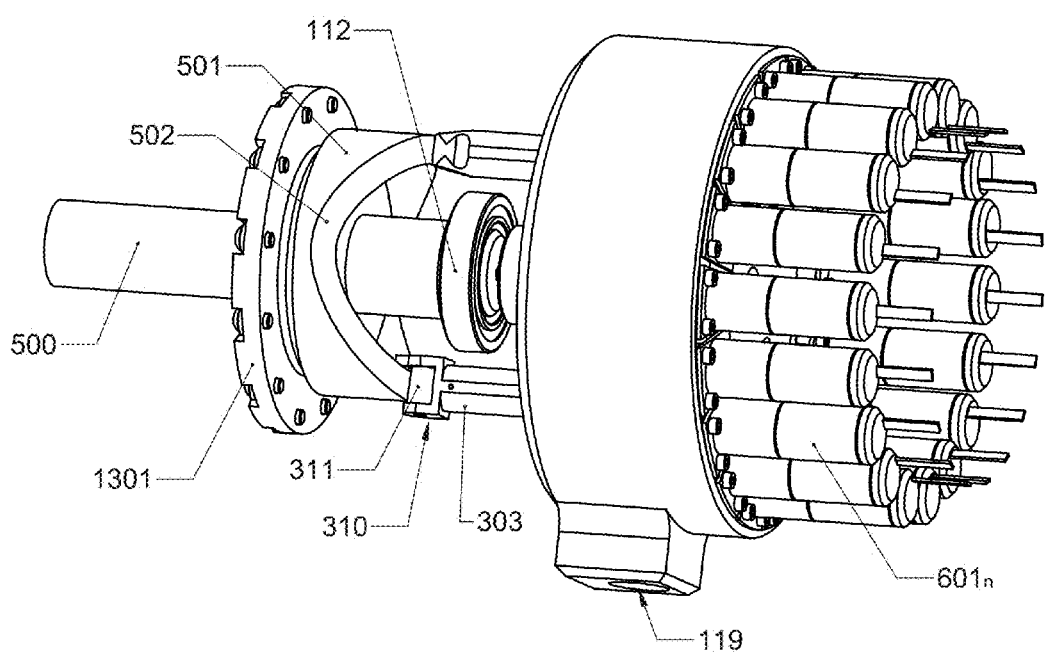

Turning now to FIG. 14, illustrating in FIG. 14A front isometric view of axial configuration of the axial piston orientation of the hydromechanical, semi continuously variable transmission (sCVT) 1300 (see e.g., FIG. 12), without cylindrical piston housing 1302, and with drive shaft 500, extending through transmission housing cover disc 1301 at the distal end, while proximal end is operably coupled to encoder 400. As shown, cylindrical drive shaft head 501 defines a sinusoidal surface (or lip, 502 not shown, see e.g., FIG. 14B) configured to be rotated by pistons $300_p$, for example, friction piston 304, being in fluid communication with spool valve $200_q$, with actuators, or servo motors $601_n$, operably coupled to cylindrical transmission housing 1311, comprising outlet port 119. As shown actuators $601_n$, can be a servo motor, having lead 650, motor portion 640, motor gear assembly 645 and servo motor encoder 648.

Turning now to FIG. 14B, showing a rear isometric view with only a couple of pistons and without cylindrical piston housing 1302, for illustration purposes only. As shown, drive shaft 500, extending through transmission housing cover disc 1301 at the distal end, while proximal end is operably coupled to bearing 112. As shown, cylindrical drive shaft head 501 defines a sinusoidal surface (or lip) configured to be rotated by pistons $300_p$, for example, friction piston 304, or roller piston 303 operably coupled to cylindrical transmission housing 1311, comprising outlet port 119. Also shown is roller piston 303 having a distal end comprising bracket 310 with and frusto-conical roller bearing 311, whereby the angle defined by frusto-conical roller bearing 311 is configured to assure the wider base of frusto conical roller bearing 311 and the narrower end of the frusto-conical roller bearing 311 rotate at the same speed thus preventing unnecessary friction and heat. Bracket 310 extends longer at the internal wall of cylindrical drive shaft head 501.

Figure 15A:
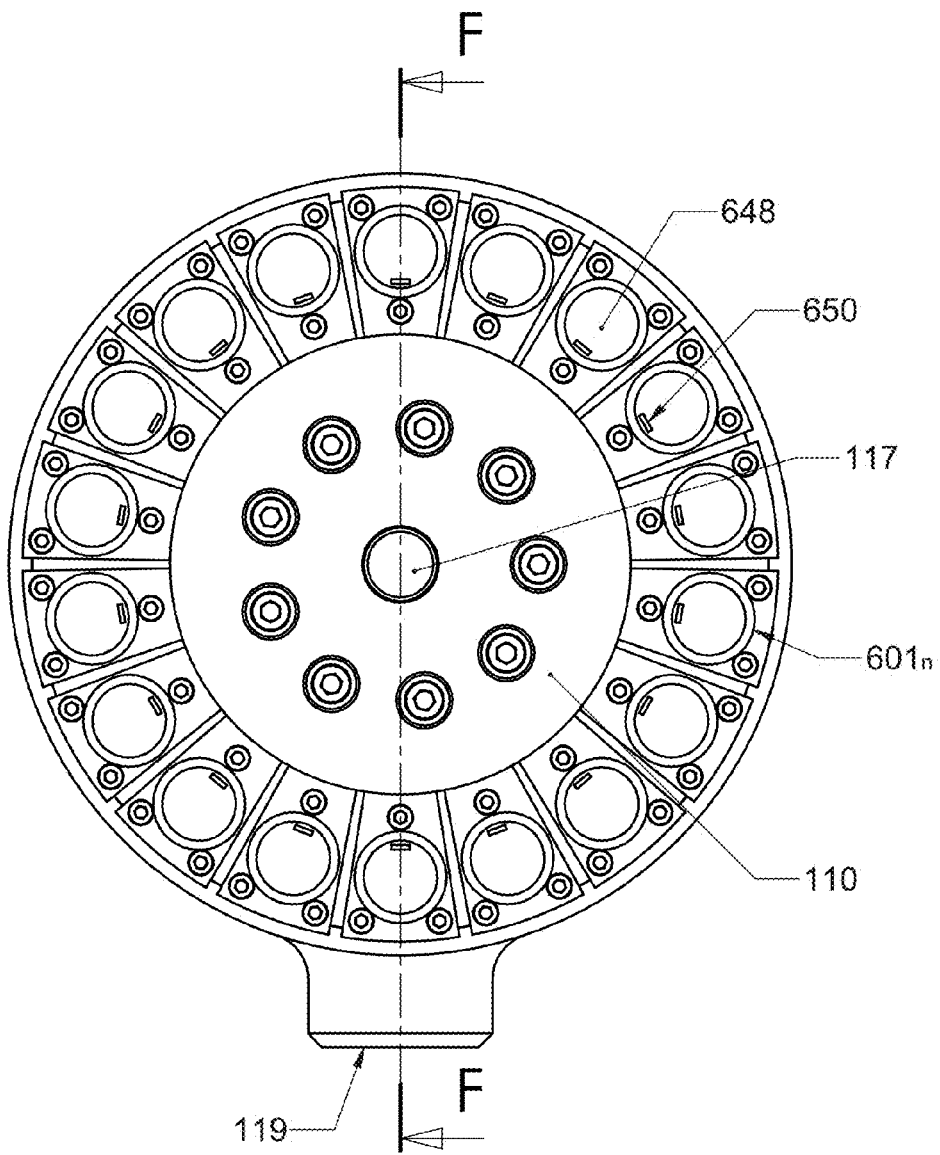
FIGS. 15A and 15B show a rear view (FIG. 15A) of the axial piston orientation of the hydromechanical continuous variable transmission defining cross section F-F, with cross section F-F illustrated in FIG. 15B.
Figure 15B:
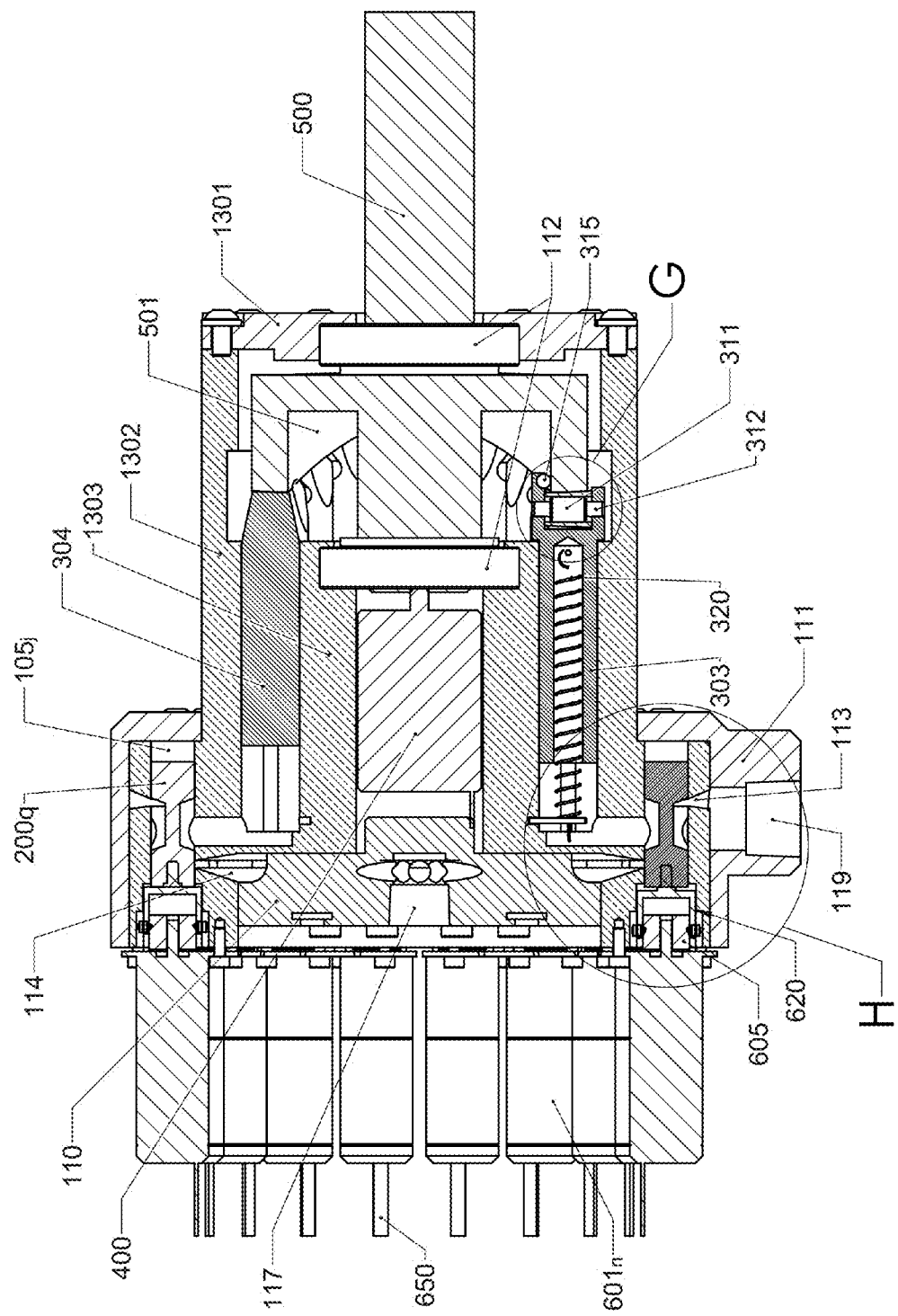

Turning now to FIG. 15, illustrating a rear view of the axial piston orientation of the hydromechanical, semi continuously variable transmission (sCVT) 1300 (see e.g., FIG. 12), with actuators (or servo motors) $601n$, oriented axially around transmission housing base disc 110, defining hydraulic fluid inlet port 117, with actuator lead 650 and encoder 648 visible, as well as hydraulic fluid outlet port 119. FIG. 15A also defines cross section B-B, illustrated in detail in FIG. 15B.

As shown in FIG. 15B illustrating cross section F-F in FIG. 15A of the axial piston orientation of the hydromechanical, semi continuously variable transmission (sCVT) 1300, comprising: transmission housing base disc 110 transmission housing is 1302, 110 is rear part with inlet 117 and radial fluid inlet port114 (see e.g. FIG.-12) and holes connection between inlet 117 and radial inlet port 114, comprising inlet port 117 coupled to torus inlet manifold 114 for a hydraulic fluid with cylindrical piston housing 1302 having a proximal axial end and a distal axial end, and internal radial surface and external radial surface, cylindrical piston housing 1302 defining a cylindrical space, with internal wall 1303, configured to receive plurality of axially oriented pistons $300_p$, (see e.g., FIG. 12) wherein the proximal axial end of the $p^{th}$ roller piston 303 or friction piston 304 is operably coupled to transmission housing base disc 110 of transmission housing comprised of a cylinder having external wall 1302 and internal wall 1303. Plurality of spool valve housing $105_j$, each having a proximal axial end and a distal axial end disposed radially, with outlet port 113 operably coupled to actuator $601_n$ having lead 650 with the plurality of axially oriented pistons $300_p$, each $p^{th}$ piston slidably coupled within the cylindrical space defined between the walls of cylindrical piston housing 1302 having internal wall 1303, and each piston (e.g., friction piston 304) having a proximal end and a distal end, wherein the proximal end extends into cylindrical piston housing 1302 having internal wall 1303, configured to engage drive shaft head 501. Also shown are plurality of spool valves $200_q$, each disposed within the spool valve housing $105_j$ valve 200 operably coupled to actuator $601_n$ and configured to regulate fluid communication between the distal end of, e.g., roller piston 303 and the hydraulic fluid by exposing or blocking inlet port 117 coupled to torus inlet manifold 114 and outlet port 113 of the hydraulic fluid. Drive shaft 500 illustrated having a distal end and a proximal end, drive shaft 500 having a drive shaft head 501 defining a cylinder, the cylinder having an internal surface and external surface and being closed at the distal end, with the proximal end defining a sinusoidal surface (or lip) 502 (not shown see e.g., FIG. 14B) configured to engage the distal end of roller piston 303 or friction piston 304, and wherein the distal end of drive shaft 500 extends beyond transmission housing cover disc 1301 and the proximal end of drive shaft 500 is operably coupled to encoder 400. Encoder 400 is centrally coupled to transmission housing base disc 110 and coupled to the drive shaft 500. Transmission housing cover disc 1301, is coupled to the distal end of cylindrical transmission housing 1311.

As shown, plurality of actuators, or servo motors $601_n$, each operably coupled to the cylindrical transmission housing 1311 with means for converting each $n^{th}$ servo motor's $601_n$ rotational motion to reciprocating linear motion 620, the conversion means operably coupling each $q^{th}$ spool valve $200_q$ to each $n^{th}$ servo motor (or actuator) $601_n$. Also shown in FIG. 15B is biasing means 320, configured to bias roller piston 303 away from cylindrical drive shaft head 501, when the piston is not engaged by actuator $601_n$ via encoder 400. In addition, as shown in detail E, roller piston 303 further comprises a distal end comprising bracket 310 with and frusto-conical roller bearing 311, and wherein ball bearing 315 is sandwiched between internal arm of bracket 310 and internal wall of cylindrical drive shaft head 501.

Figure 16A:
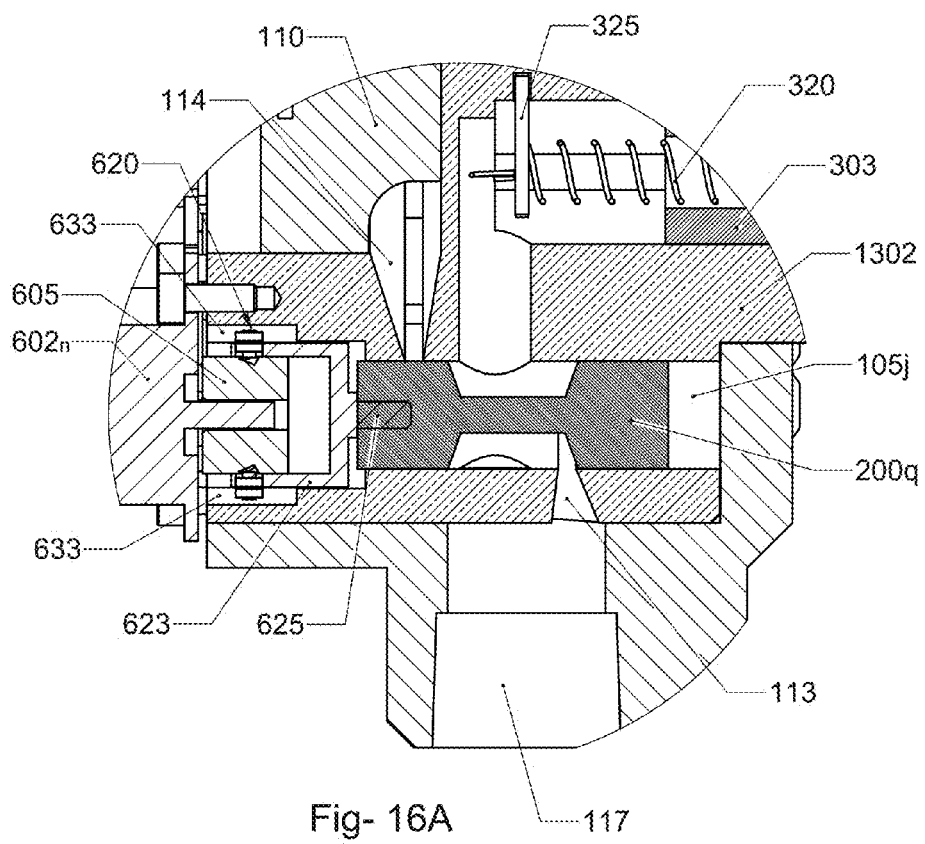
FIGS. 16A and 16B show detail H (FIG. 16A) and detail G (FIG. 16B) defined in FIG. 15B.

Details of FIG. 15B is further magnified in FIG. 16, where FIG. 16A illustrates detail D in FIG. 15B, showing actuator cylinder member $602_n$, means for converting each $n^{th}$ servo motor's $601_n$ rotational motion to reciprocating linear motion 620, the conversion means operably coupling each $q^{th}$ spool valve $200_q$ to each $n^{th}$ servo motor (or actuator) $601_n$. As shown; means 620 comprising cylindrical cap 623 having pin 625 disposed axially at the closed distal end, and configured to engage spool valve $200_q$ and an open proximal end configured to receive dowel 605 operably coupled to actuator (or servo motor) $601_n$ drive shaft and having sinusoidal groove 606 (not shown, see e.g., FIG. 13A) etched therein, wherein groove 606 is configured to receive bearing disc 621 rotatably coupled to detent member 622 (not shown, see e.g., FIG. 13A), wherein disc 621 traverses the wall of cylindrical cap 623 along axial plane 633. A second assembly of detent 621 and rotatably coupled disc 622 is disposed at 180°, likewise configured to slidably engage groove 606 etched in dowel 605. Also shown in FIG. 16A, is biasing means 320, configured to bias roller piston 303 away from cylindrical drive shaft head 501, when the piston is not engaged by actuator $601_n$ via encoder 400. Further shown in FIG. 16A, are inlet port 117 coupled to torus inlet manifold 114, outlet port 113, and valve housing $105_j$.

Figure 16B:
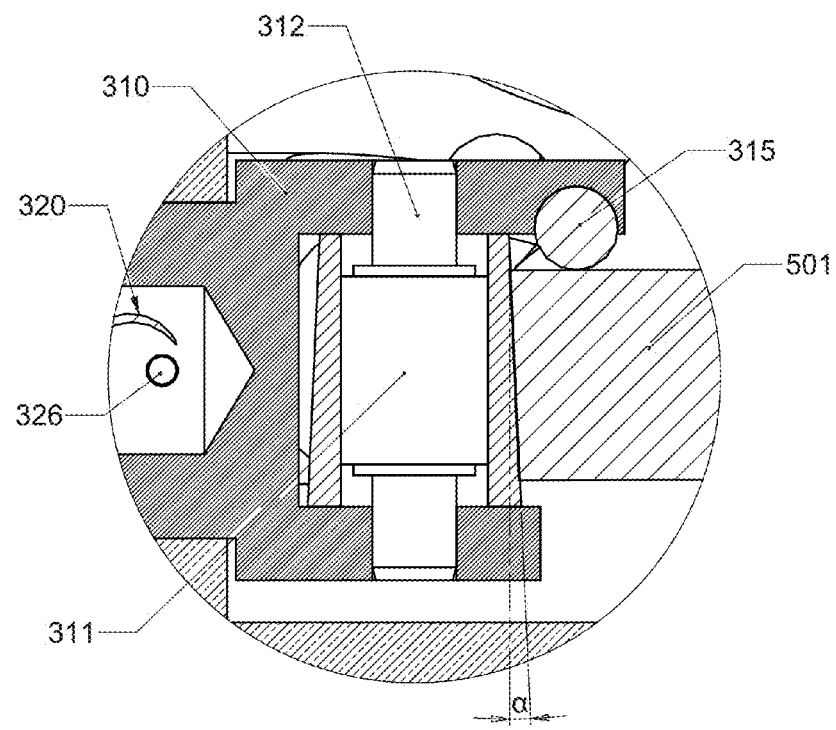

Turning now to FIG. 16B, showing detail E in FIG. 15B, where roller piston 303 further comprises a distal end comprising bracket 310 with and frusto-conical roller bearing 311 is operably coupled to bracket 310 arms with roller bearing shaft 312, and wherein ball bearing 315 is sandwiched between internal arm of bracket 310 and internal wall of cylindrical drive shaft head 501 and is configured to both roll and turn while piston 303 is rolling and in contact with sinusoidal surface (or lip) 502, of cylindrical drive shaft head 501. Also shown in FIG. 16B, is biasing means 320, configured to bias roller piston 303 away from cylindrical drive shaft head 501, when the piston is not engaged.

Figure 17A:
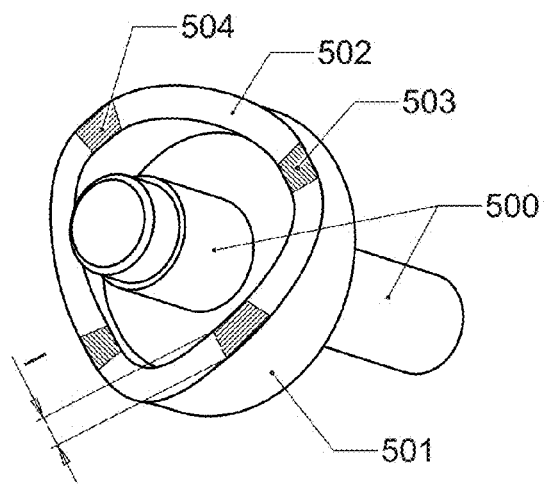
FIGS. 17A and 17B illustrate the isometric view (FIG. 17A) and top view (FIG. 17B) of the drive shaft and drive shaft head used with the axial piston orientation of the hydromechanical continuous variable transmission.
Figure 17B:
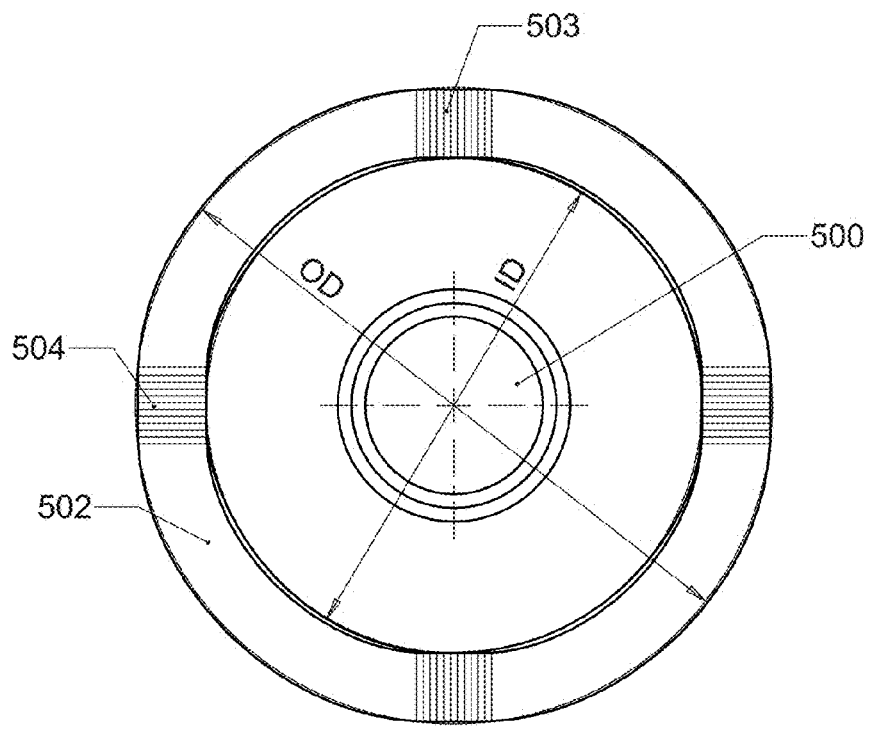

Turning now to FIG. 17, showing an isometric view (FIG. 17A) and top view (FIG. 17B) of an alternate embodiment of drive shaft 500, having a distal end and a proximal end, drive shaft 500 having a drive shaft head 501 defining a cylinder, the cylinder having an internal surface and external surface and being closed at the distal end, with the proximal end defining a sinusoidal surface (or lip) 502 configured to engage the distal end of roller piston 303 or friction piston 304 (not shown, see e.g. FIG. 14B). As shown sinusoidal lip 502 is not continuous and at the minima and maxima points, the curvature changes, and can be radial in shape and not in parabolic shape. The radial minima and maxima of the wave surfaces can be designed for adjusting transition zones, and the length can be adapted to alter the functionality of the transition mode, and could be different from one category (in other words, earth movers, ATV, pumps, sedans and the like), to another, this can allow the designer greater flexibility to design the transitions modes, and synchronize spool valve $200_q$ with elliptical drive shaft head 501 revolutions.

Figure 18A:
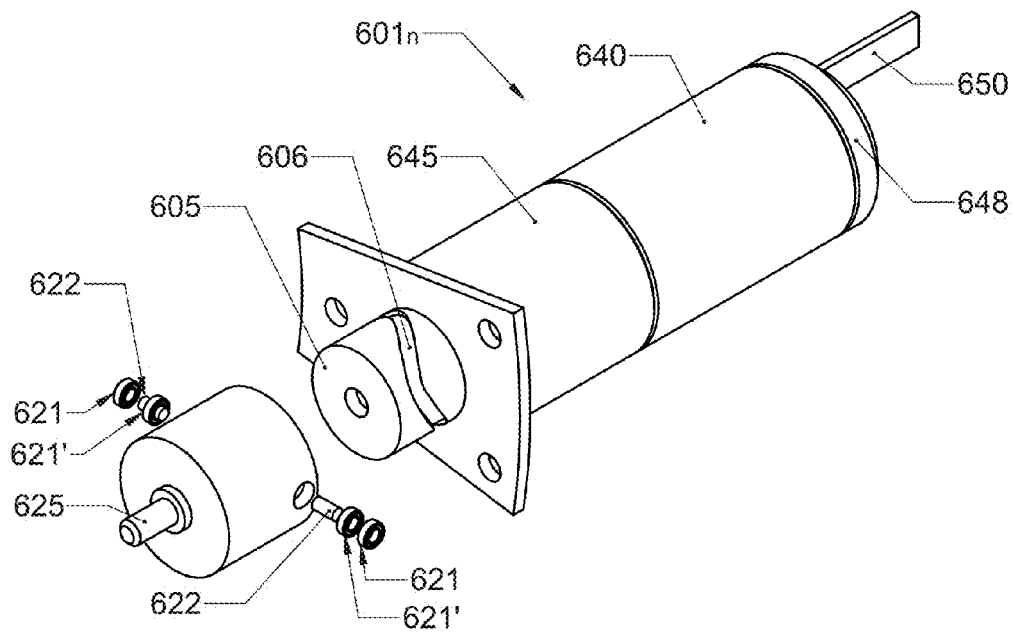
FIGS. 18A and 18B show an exploded view of a configuration of servo motor (FIG. 18A) and detail K (FIG. 18B) defined in FIG. 18A.
Figure 18B:
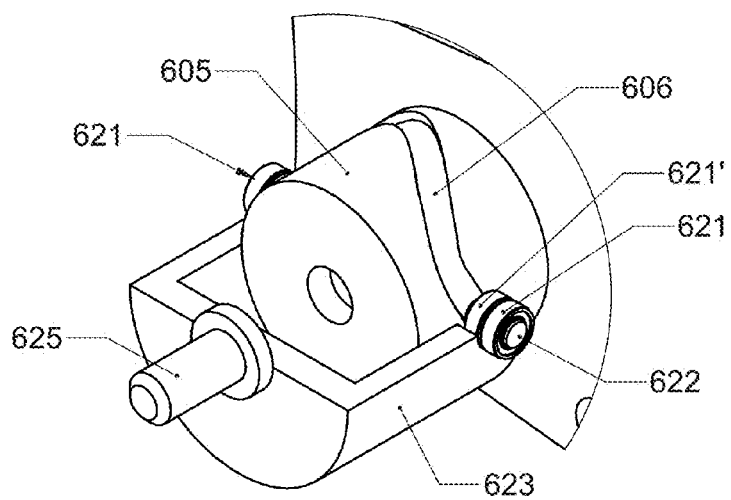

FIG. 18, illustrates in FIG. 18A the coupling between an actuator, or for example a servo motor $601_n$, having lead 650, motor portion 640, motor gear assembly 645 and servo motor encoder 648, and means 620 comprising as shown in FIG. 18B, cylindrical cap 623 having pin 625 disposed axially at the closed distal end, and configured to engage spool valve 200 (not shown, see e.g., FIG. 15B) and an open proximal end configured to receive dowel 605 operably coupled to servo motor 601 drive shaft and having sinusoidal groove 606 etched therein, wherein groove 606 is configured to receive disc 621 rotatably coupled to detent member 622, wherein disc 621 traverses the wall of cylindrical cap 623. A second assembly of detent 621 and rotatably coupled disc 622 is disposed at 180°, likewise configured to slidably engage groove 606 etched in dowel 605.

Figure 20:
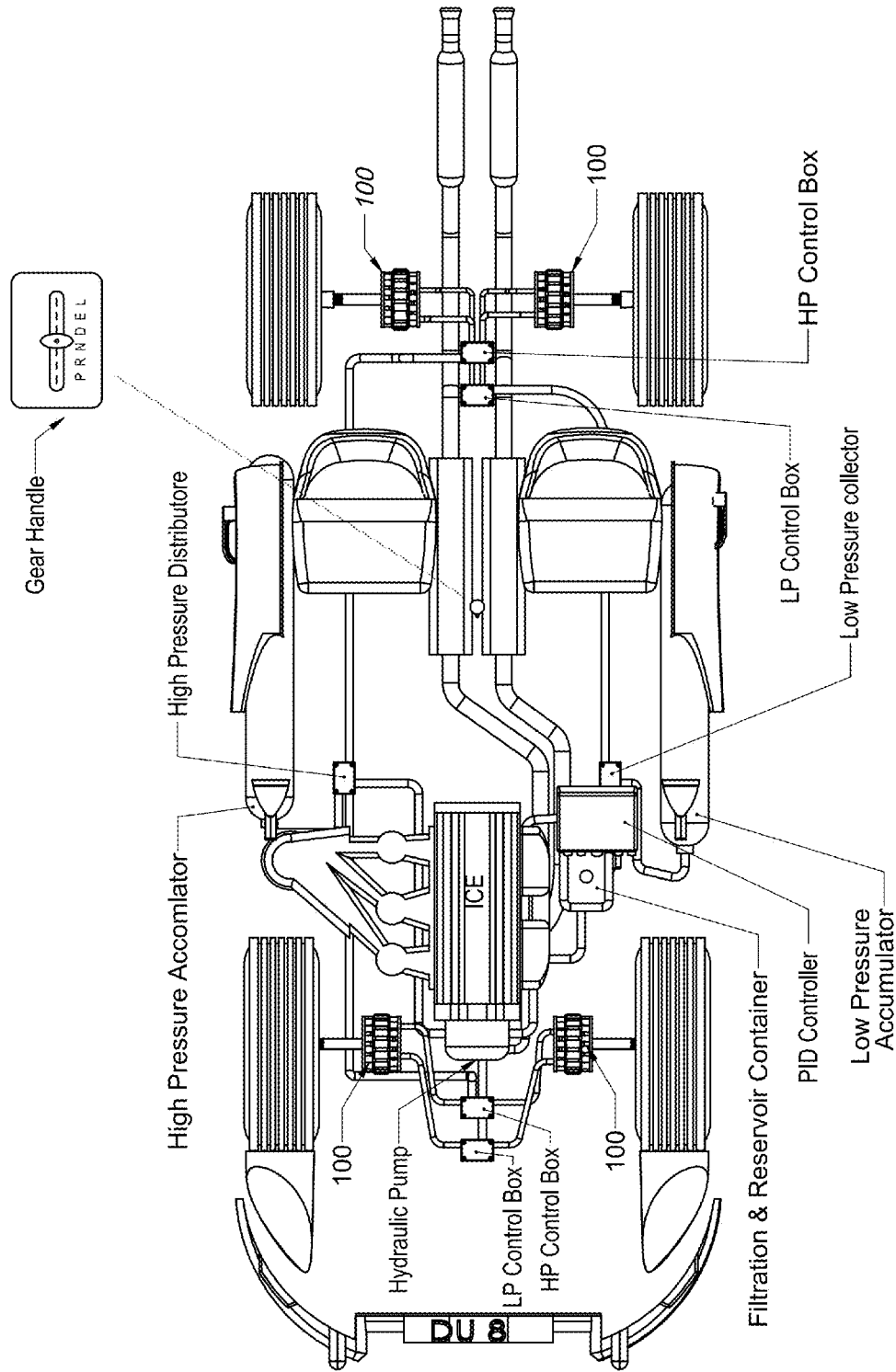
FIG. 20 illustrates an embodiment of a vehicle comprising the hydromechanical continuous variable transmission.

Turning now to FIG. 20, illustrating an embodiment of a vehicle comprising the hydromechanical continuous variable transmission (sCVDM or sCMRP module) 100 described herein located at each wheel hub.

Figure 21:
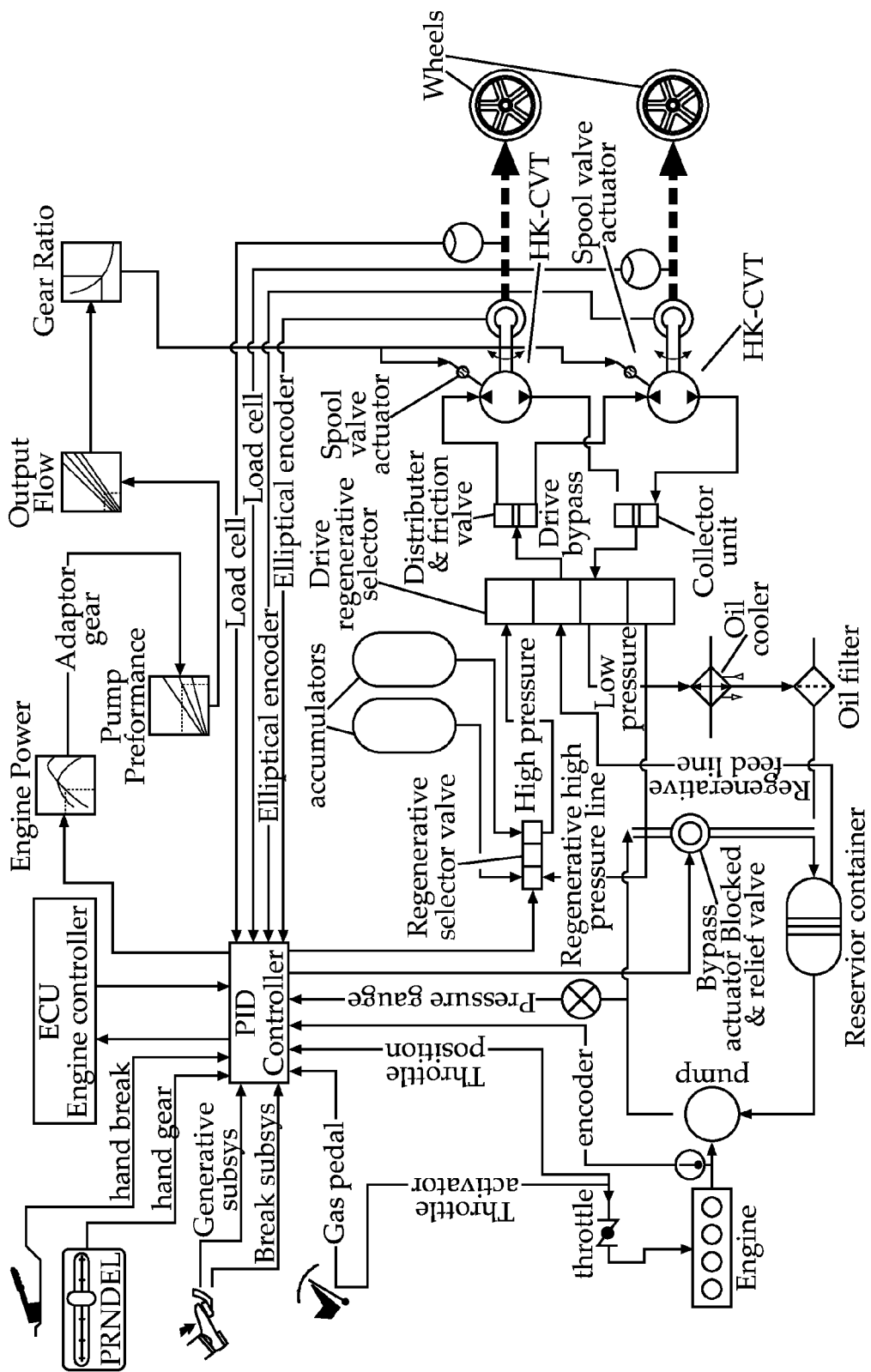
FIG. 21 is a schematic view of the components in an embodiment of a vehicle comprising the hydromechanical continuous variable transmission.

FIG. 21, is a schematic view of the components in an embodiment of a vehicle comprising the radial orientation hydromechanical continuous variable transmission 100 described herein which schematically illustrates the electronic and mechanical Hydromechanical sCVT system. The system can comprise an efficient pump (e.g., the axially oriented piston sCVDP 1300 described herein) operably coupled to the engine shaft, and bypass subassembly, sensors, control box CPU, accumulator system, friction control valve, and reservoir container to filtered and cool the hydraulic oil, and electronic Hydromechanical sCVT shaft optionally coupled to each wheel shaft.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In an embodiment, the term "coupled", including its various forms such as "operably coupling", "operably coupled", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection. In another embodiment, the term "coupled", including its various forms such as "operably coupling", "operably coupled", "coupling" or "couplable", refers to and comprises circumstances whereby two or more components in communicate with each other. "Communicate" (and its derivatives e.g., a first component "communicates with" or "is in communication with" a second component) and grammatical variations thereof are used to indicate a structural, functional, mechanical, electrical, optical, or fluidic relationship, or any combination thereof, between two or more components or elements. As such, the fact that one component is said to communicate with a second component is not intended to exclude the possibility that additional components can be present between, and/or operatively associated or engaged with, the first and second components.

In addition, the term "slidably coupled" is used in its broadest sense to refer to elements which are coupled in a way that permits one element to slide or translate within, or with respect to another element.

The term "plurality", as used herein, is defined as two or as more than two. The term "another", as used herein, is defined as at least a second or more. The terms "including" and/or "having", as used herein, are defined as comprising (i.e., open language).

The term "engage" and various forms thereof, when used with reference to the elliptical drive shaft head, refers to one or a plurality of coupled components, at least one of which is configured for releasably engage elliptical drive shaft head. Thus, this term encompasses both single part engaging elements and multi-part-assemblies.

The term "boss" generally refers to protuberance on a part designed to add strength, facilitate alignment or motion, provide fastening, provide, etc. Exemplary boss elements include shapes such as a tab, detent, flange, pole, post, etc.

The term "biasing means" refers to any device that provides a biasing force. Representative biasing elements include but are not limited to springs (e.g., elastomeric or metal springs, torsion springs, coil springs, leaf springs, tension springs, compression springs, extension springs, spiral springs, volute springs, flat springs, and the like), detents (e.g., spring-loaded detent balls, cones, wedges, cylinders, and the like), pneumatic devices, hydraulic devices, magnets, and the like, and combinations thereof. Likewise, "biasing means" as used herein refers to one or more members that applies an urging force between two elements.

Accordingly, provided herein is a hydromechanical, semi continuously variable transmission (sCVT), comprising: a transmission housing base disc, comprising an inlet port for a hydraulic fluid; a cylindrical transmission housing having a proximal axial end and a distal axial end, and an internal radial surface and external radial surface, the transmission housing defining a plurality of bores disposed radially at the distal axial end, wherein the proximal axial end is operably coupled to the transmission housing base disc; a plurality of valve housing each having a proximal axial end and a distal axial end disposed axially above the plurality of bores defined in the transmission housing, the valve housing having an inlet port and an outlet port and being in fluid communication with a hydraulic pump and operably coupled to an actuator; a plurality of pistons, each slidably coupled within the bore defined in the periphery of the cylindrical transmission housing having a proximal end and a distal end, wherein the proximal end extends into the internal radial surface of the cylindrical transmission housing, configured to engage a drive shaft; a plurality of valves, each disposed within the valve housing, the valve operably coupled to an actuator and configured to regulate fluid communication between the distal end of the piston and the hydraulic fluid by exposing or blocking the inlet port and the outlet port of the hydraulic fluid; a drive shaft, having a distal end and a proximal end, the drive shaft having an elliptical head having a longitudinal axis and a transverse axis perpendicular to the longitudinal axis disposed at the proximal end of the drive shaft, wherein the distal end extends beyond a transmission housing cover disc and is operably coupled to a wheel or a gear and the proximal end is operably coupled to an encoder; an encoder centrally coupled to the transmission housing base disc and coupled to the elliptical drive shaft head; a transmission housing cover disc, coupled to the distal end of the cylindrical transmission housing; a plurality of actuators, each operably coupled to the valve; and a control module, configured to receive input from a plurality of sensors and engage a predetermined number of pistons at a predetermined location along the periphery of the cylindrical transmission housing, the location of the actuators configured to impart continuous radial motion to the drive shaft head, wherein the number of piston engaged depends on the input received from the plurality of sensors, wherein, (i), the plurality of bores, comprise between 8 and 56 bores, (ii) the elliptical drive shaft head further comprises a radial layer, (iii) having cylindrical bearings axially disposed between the radial layer and the elliptical drive shaft head, operably coupled to the elliptical drive shaft head, configured to rotate around the drive shaft independently of the elliptical drive shaft head, (iv), the piston proximal end is operably coupled to a bearing configured to engage the periphery of the elliptical drive shaft head, (v) the bores defined by the radial surface of the cylindrical transmission housing are disposed radially at the distal axial end in an array comprising at least two rows of bores, (vi) wherein the drive shaft is configured to engage all rows pistons in a single head, (vii) wherein the drive shaft is configured to engage each row of pistons in a single head, (viii) the input to the control module is received from a wheel or gear torque sensor, the drive shaft torque sensor, the encoder, a motor revolution per minute sensor, a gear or wheel revolution per minute sensor, hydraulic fluid pressure sensor, or a combination comprising the foregoing, (ix) wherein the drive shaft head defines at least two diametrically opposed working zones; at least two diametrically opposed discharge zones; and at least two diametrically opposed transition zones, (x) wherein, at a fixed or increasing hydraulic fluid pressure, the higher the load on the wheel or gear, the larger is the number of pistons engaged by the control module in the working zone, and (xi) wherein, at a fixed or decreasing load on the wheel or gear, the higher the hydraulic pressure, the smaller is the number of pistons engaged by the control module in the working zone, wherein (xii) at the vertices of the ellipse defined by the elliptical head, the major and minor semiaxis are different and define a circular arc between center angle of about 2° and about 20°, with radii that are shorter and longer respectively than the major and minor semiaxis at the remaining ellipse curvature, wherein (xiii) the valve is a rotating valve and (xiv) the actuator is a servo motor configured to rotate the rotating valve, wherein (xv) the valve is a spool valve, and the actuator is a servo motor, further comprising means for converting rotational motion to reciprocating linear motion, wherein the means for converting rotational motion to reciprocating linear motion are operably coupled to the spool valve, and wherein (xvi) the unengaged pistons are biased away from the elliptical drive shaft head.

In another embodiment provided herein is a vehicle comprising: an engine; a hydraulic pump coupled to the engine; and a hydromechanical sCVT assembly, the hydromechanical sCVT in fluid communication with the hydraulic pump, wherein the hydromechanical sCVT is operably coupled to two wheels on opposite sides of the vehicle, wherein (xvi) the vehicle further comprises optionally, an additional hydromechanical sCVT of claim 1, the hydromechanical sCVT in fluid communication with the hydraulic pump coupled to each additional wheel of the vehicle; a high pressure accumulator; a low-pressure accumulator; and a reservoir container, all in fluid communication with the hydraulic pump, (xvii) and a hydraulic line having a proximal end coupled to the hydraulic pump and a distal end operably coupled to a proportional valve, wherein the proportional valve is operably coupled between at least a pair of the hydromechanical sCVT described herein.

In yet another embodiment, provided is a method of modulating the ratio between a motor's drive shaft and wheel or gear operably coupled to the motor, the method comprising the steps of: coupling the motor drive shaft to a hydraulic pump; coupling the hydraulic pump to a hydromechanical, semi-continuous variable transmission (sCVT); coupling the hydromechanical, semi-continuous variable transmission to a gear or a wheel, whereby the hydromechanical, semi-continuous variable transmission is configured to rotate a drive shaft coupled to the gear or wheel using hydraulic fluid pumped by the hydraulic pump to actuate a plurality of pistons disposed radially around the drive shaft head; and, by adding or reducing the number of working pistons per revolution of the hydromechanical, semi-continuous variable transmission's drive shaft head, continuously varying the flow of the hydraulic fluid by discrete variable displacement per revolution, thereby changing the volume of displacement per revolution and modulating the ratio between a motor's drive shaft revolutions per minute and the revolutions per minute of a wheel or gear operably coupled to the motor, whereby (xviii) the number of working pistons in an operation cycle per revolution of the hydromechanical, semi-continuous variable transmission's drive shaft head will set the transmission ratio at any given gear or wheel moment coupled thereto, (xix) the number of working pistons in an operation cycle per revolution of the drive shaft head in the hydromechanical, semi-continuous variable transmission, is configured to operate the motor along the optimum fuel efficiency curve (IOL) of the motor torque as a function of the motor drive shaft RPM, (xx) the plurality of pistons are disposed radially around the drive shaft head of the hydromechanical, semi-continuous variable transmission in one or more rows, and (xxi) the drive shaft head of the hydromechanical, semi-continuous variable transmission is elliptical.

In yet another embodiment, provided herein is a hydromechanical, semi continuously variable transmission (sCVT), comprising: transmission housing base disc, defining an inlet port for a hydraulic fluid; a cylindrical piston housing having a proximal axial end and a distal axial end, and an internal radial surface and external radial surface, wherein the cylindrical piston housing defining a cylindrical space, configured to receive a plurality of axially oriented pistons, wherein the proximal axial end of the piston is operably coupled to transmission the housing base disc; a plurality of spool valve housing, each having a proximal axial end and a distal axial end disposed radially, the spool valve housing having inlet port and outlet port and being in fluid communication with a hydraulic pump and operably coupled to actuator; a plurality of axially oriented pistons, each slidably coupled within the cylindrical space defined between the walls of cylindrical piston housing having an internal wall, and each piston having a proximal end and a distal end, wherein the proximal end extends into cylindrical piston housing having internal wall, configured to engage a drive shaft head; a plurality of spool valves, each disposed within the spool valve housing and operably coupled to actuator and configured to regulate fluid communication between the distal end of the piston and the hydraulic fluid by exposing or blocking the inlet port and outlet port of the hydraulic fluid; a drive shaft having a distal end and a proximal end, the drive shaft having a drive shaft head defining a cylinder, the cylinder having an internal surface and external surface and being closed at the distal end, with the proximal end defining a sinusoidal surface configured to engage the distal end of the piston, and wherein the distal end of the drive shaft extends beyond the transmission housing cover disc and the proximal end of the drive shaft is operably coupled to an encoder; an encoder centrally coupled to the transmission housing base disc and coupled to the drive shaft; a transmission housing cover disc coupled to the distal end of cylindrical transmission housing; a plurality of actuators, or servo motors each operably coupled to the cylindrical transmission housing; means for converting rotational motion to reciprocating linear motion, the conversion means operably coupling each spool valve to each servo motor; and a control module, configured to receive input from a plurality of sensors and engage a predetermined number of actuators at a predetermined location along the periphery of the cylindrical transmission housing, the location of the pistons configured to impart continuous radial motion to the drive shaft head, wherein the number of piston engaged depends on the input received from the plurality of sensors, wherein (xxii) the plurality of pistons, comprise between 5 and 168 pistons, (xxiii) the piston proximal end comprises a bracket operably coupled to a roller bearing configured to engage the sinusoidal surface defined by the proximal end of the drive shaft head, (xxiv) the roller bearing is frusto conical, and wherein (xxv) the bracket further comprises a ball bearing, captured within the bracket and configured to both roll and turn upon contact with the internal surface defined by the cylindrical shaft head.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

The invention claimed is:

1. A hydromechanical, semi continuously variable transmission (sCVT), comprising:
   a. a transmission housing base disc, comprising an inlet port for a hydraulic fluid;
   b. a cylindrical transmission housing having a proximal axial end and a distal axial end, and an internal radial surface and external radial surface, the transmission housing defining a plurality of bores disposed radially at the distal axial end, wherein the proximal axial end is operably coupled to the transmission housing base disc;
   c. a plurality of valve housing each having a proximal axial end and a distal axial end disposed axially above the plurality of bores defined in the transmission housing, the valve housing having an inlet port and an outlet port and being in fluid communication with a hydraulic pump and operably coupled to an actuator;
   d. a plurality of pistons, each slidably coupled within the bore defined in the periphery of the cylindrical transmission housing having a proximal end and a distal end, wherein the proximal end extends into the internal radial surface of the cylindrical transmission housing, configured to engage a drive shaft;
   e. a plurality of valves, each disposed within the valve housing, the valve operably coupled to one of the plurality of actuators and configured to regulate fluid communication between the distal end of the piston and the hydraulic fluid by exposing or blocking the inlet port and the outlet port of the hydraulic fluid;
- f. a drive shaft, having a distal end and a proximal end, the drive shaft having an elliptical head having a longitudinal axis and a transverse axis perpendicular to the longitudinal axis disposed at the proximal end of the drive shaft, wherein the distal end extends beyond a transmission housing cover disc and is operably coupled to a wheel or a gear and the proximal end is operably coupled to an encoder;
- g. an encoder centrally coupled to the transmission housing base disc and coupled to the elliptical drive shaft head;
- h. a transmission housing cover disc, coupled to the distal end of the cylindrical transmission housing;
- i. the plurality of actuators, each operably coupled to the valve; and
- j. a control module, configured to receive input from a plurality of sensors and engage a predetermined number of pistons at a predetermined location along the periphery of the cylindrical transmission housing, the location of the actuators configured to impart continuous radial motion to the drive shaft head, wherein the number of piston engaged depends on the input received from the plurality of sensors.

2. The hydromechanical sCVT of claim 1, wherein the plurality of bores, comprise between 5 and 168 bores.

3. The hydromechanical sCVT of claim 1, wherein the elliptical drive shaft head further comprises a radial layer, operably coupled to the elliptical drive shaft head, configured to rotate around the drive shaft independently of the elliptical drive shaft head.

4. The hydromechanical sCVT of claim 3, having cylindrical bearings axially disposed between the radial layer and the elliptical drive shaft head.

5. The hydromechanical sCVT of claim 1, wherein the piston proximal end is operably coupled to a bearing configured to engage the periphery of the elliptical drive shaft head.

6. The hydromechanical sCVT of claim 1, wherein the input to the control module is received from a wheel or gear torque sensor, the drive shaft torque sensor, the encoder, a motor revolution per minute (RPM) sensor, a gear or wheel revolution per minute (RPM) sensor, hydraulic fluid pressure sensor, or a combination comprising the foregoing.

7. The hydromechanical sCVT of claim 6, wherein the drive shaft head defines at least two diametrically opposed working zones; at least two diametrically opposed discharge zones; and at least two diametrically opposed transition zones.

8. The hydromechanical sCVT of claim 7, wherein at the vertices of the ellipse defined by the elliptical head, the major and minor semiaxis are different and define a circular arc between center angle of about 2° and about 20°, with radii that are shorter and longer respectively than the major and minor semiaxis at the remaining ellipse curvature.

9. The hydromechanical sCVT of claim 7, wherein, at a fixed or increasing hydraulic fluid pressure, the higher the wheel torque or gear, the larger is the number of pistons engaged by the control module in the working zone.

10. The hydromechanical sCVT of claim 7, wherein, at a fixed or decreasing load on the wheel or gear, the higher the hydraulic pressure, the smaller is the number of pistons engaged by the control module in the working zone.

11. The hydromechanical sCVT of claim 1, wherein the valve is a rotating valve.

12. The hydromechanical sCVT of claim 11, wherein the actuator is a servo motor configured to rotate the rotating valve.

13. The hydromechanical sCVT of claim 1, wherein the valve is a spool valve.

14. The hydromechanical sCVT of claim 13, wherein the actuator is a servo motor, further comprising means for converting rotational motion to reciprocating linear motion, wherein the means for converting rotational motion to reciprocating linear motion are operably coupled to the spool valve.

15. The hydromechanical sCVT of claim 1, where the unengaged pistons are biased away from the elliptical drive shaft head.

16. A hydromechanical, semi continuously variable transmission (sCVT), comprising:
- a. a transmission housing base disc, defining an inlet port for a hydraulic fluid;
- b. a cylindrical piston housing having a proximal axial end and a distal axial end, and an internal radial surface and external radial surface, wherein the cylindrical piston housing defining a cylindrical space, configured to receive a plurality of axially oriented pistons, wherein the proximal axial end of the piston is operably coupled to transmission the housing base disc;
- c. a plurality of spool valve housing, each having a proximal axial end and a distal axial end disposed radially, the spool valve housing having inlet port and outlet port and being in fluid communication with a hydraulic pump and operably coupled to actuator;
- d. a plurality of axially oriented pistons, each slidably coupled within the cylindrical space defined between the walls of cylindrical piston housing having an internal wall, and each piston having a proximal end and a distal end, wherein the proximal end extends into cylindrical piston housing having internal wall, configured to engage a drive shaft head;
- e. a plurality of spool valves, each disposed within the spool valve housing and operably coupled to one of the plurality of actuators and configured to regulate fluid communication between the distal end of the piston and the hydraulic fluid by exposing or blocking the inlet port and outlet port of the hydraulic fluid;
- f. a drive shaft having a distal end and a proximal end, the drive shaft having a drive shaft head defining a cylinder, the cylinder having an internal surface and external surface and being closed at the distal end, with the proximal end defining a sinusoidal surface configured to engage the distal end of the piston, and wherein the distal end of the drive shaft extends beyond the transmission housing cover disc and the proximal end of the drive shaft is operably coupled to an encoder;
- g. an encoder centrally coupled to the transmission housing base disc and coupled to the drive shaft;
- h. a transmission housing cover disc coupled to the distal end of cylindrical transmission housing;
- i. a plurality of servo motors each operably coupled to the cylindrical transmission housing;
- j. means for converting rotational motion to reciprocating linear motion, the conversion means operably coupling each spool valve to each servo motor; and a
- k. control module, configured to receive input from a plurality of sensors and engage a predetermined number of the plurality of actuators at a predetermined location along the periphery of the cylindrical transmission housing, the location of the pistons configured to impart continuous radial motion to the drive shaft head, wherein the number of piston engaged depends on the input received from the plurality of sensors.

17. The hydromechanical sCVT of claim 16, wherein the plurality of pistons, comprise between 5 and 168 pistons.

18. The hydromechanical sCVT of claim 16, wherein the piston proximal end comprises a bracket operably coupled to a roller bearing configured to engage the sinusoidal surface defined by the proximal end of the drive shaft head.

19. The hydromechanical sCVT of claim 18, wherein the roller bearing is frusto conical.

20. The hydromechanical sCVT of claim 18, wherein the bracket further comprises a ball bearing, captured within the bracket and configured to both roll and turn upon contact with the internal surface defined by the cylindrical shaft head.

* * * * *